(12) United States Patent
Miyazaki

(10) Patent No.: US 12,493,728 B2
(45) Date of Patent: Dec. 9, 2025

(54) NETWORK CONSTRUCTION SUPPORT SYSTEM

(71) Applicant: Mitsubishi Electric Corporation, Tokyo (JP)

(72) Inventor: Kiyohito Miyazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 883 days.

(21) Appl. No.: 17/694,869

(22) Filed: Mar. 15, 2022

(65) Prior Publication Data

US 2022/0198094 A1 Jun. 23, 2022

Related U.S. Application Data

(63) Continuation of application No. PCT/JP2019/043910, filed on Nov. 8, 2019.

(51) Int. Cl.
*G06F 30/18* (2020.01)
*G06F 30/20* (2020.01)
(Continued)

(52) U.S. Cl.
CPC .............. *G06F 30/18* (2020.01); *G06F 30/20* (2020.01); *G06F 2111/20* (2020.01); *G06F 2119/22* (2020.01)

(58) Field of Classification Search
CPC ...... G06F 30/18; G06F 30/20; G06F 2119/22; G06F 2111/20
(Continued)

(56) References Cited

U.S. PATENT DOCUMENTS

2014/0130002 A1* 5/2014 AbdelAzim ............ G06F 30/39
716/112
2015/0139352 A1* 5/2015 Matsuo .................. H04B 17/12
375/295
(Continued)

FOREIGN PATENT DOCUMENTS

CN 109146124 A 1/2019
EP 1 544 771 A1 6/2005
(Continued)

OTHER PUBLICATIONS

"Cost-Effective Optimization for an Energy Efficient Design of Electrical Installations of Buildings" Published by IEEE (Year: 2018).*
(Continued)

*Primary Examiner* — Zeina Elchanti
(74) *Attorney, Agent, or Firm* — Birch, Stewart, Kolasch & Birch, LLP

(57) ABSTRACT

A network construction support system (100) generates one or more pieces of layout data (101) indicating a layout of construction assisting tools (140). The network construction support system calculates a countermeasure cost and an estimated risk amount, for each layout data, the countermeasure cost increasing as a number of units of construction assisting tools increases, the estimated risk amount decreasing as the number of units of construction assisting tools increases and as a narrowed range by each construction assisting tool narrows. The network construction support system judges an appropriateness of the layout data for the apparatus network system, for each layout data, on the basis of a countermeasure cost, an estimated risk amount, and an allowable risk amount which is allowed for the apparatus network system, The network construction support system
(Continued)

outputs layout data judged to be appropriate for the apparatus network system.

12 Claims, 14 Drawing Sheets

(51) Int. Cl.
   *G06F 111/20* (2020.01)
   *G06F 119/22* (2020.01)
(58) Field of Classification Search
   USPC .............................................................. 705/4
   See application file for complete search history.

(56) References Cited

U.S. PATENT DOCUMENTS

| | | | |
|---|---|---|---|
| 2019/0394278 | A1 | 12/2019 | Fujimoto et al. |
| 2020/0059111 | A1* | 2/2020 | Guo .......................... H02J 7/04 |

FOREIGN PATENT DOCUMENTS

| | | | |
|---|---|---|---|
| JP | 60-69931 | A | 4/1985 |
| JP | 8-170850 | A | 7/1996 |
| JP | 2007-46822 | A | 2/2007 |
| JP | 2013-204863 | A | 10/2013 |
| JP | 2014-150386 | A | 8/2014 |
| JP | 2019-66106 | A | 4/2019 |
| JP | 6493590 | B2 | 4/2019 |
| WO | WO 2018/181780 | A1 | 10/2018 |

OTHER PUBLICATIONS

Chinese Office Action for Chinese Application No. 201980101679. 4, dated May 30, 2025, with English translation.
Chinese Office Action and Search Report for Chinese Application No. 201980101679.4, dated Nov. 20, 2024, with English translation.
Extended European Search Report for European Application No. 19951338.3, dated Aug. 29, 2022.
International Search Report (PCT/ISA/210) issued in PCT/JP2019/043910, dated Dec. 10, 2019.
Office Action issued in Japanese Application No. 2020-505920, dated Jun. 9, 2020.
European Communication pursuant to Article 94(3) EPC for European Application No. 19951338.3, dated Mar. 21, 2023.
Chinese Office Action for Chinese Application No. 201980101679. 4, dated Sep. 22, 2025, with English translation.

* cited by examiner

NETWORK CONSTRUCTION SUPPORT SYSTEM

CROSS REFERENCE TO RELATED APPLICATIONS

This application is a Continuation of PCT International Application PCT/JP2019/043910, filed on Nov. 8, 2019, which is hereby expressly incorporated by reference into the present application.

TECHNICAL FIELD

The present invention relates to a fault countermeasure of an apparatus network system.

BACKGROUND ART

Networks of a multi-drop scheme are widely used in industrial fields such as air-conditioning control, power distribution monitoring, and factory automation control.

The multi-drop scheme is a scheme in which, for example, a plurality of communication apparatuses are connected in parallel by network wiring. With this scheme, even if communication apparatuses are arranged midway along a wiring path, only one suite of communication terminal block suffices for the communication apparatuses. Therefore, this scheme has advantages such as (1) and (2): (1) workability is good because a number of times of screw fixing work of wiring required at the time of construction is small; and (2) the cost of communication apparatuses is suppressed.

Therefore, the multi-drop scheme is widely used.

There is a case where an apparatus network system of the multi-drop scheme is provided with a controller.

The controller has a function of monitoring and controlling the entire system.

In order to further improve the workability, the multi-drop scheme is often applied in combination with a free topology scheme.

The free topology scheme is a scheme with which a wiring can be branched at any location.

Patent Literature 1 discloses the following system for a purpose of saving labor for installation and setting work of apparatuses of air-conditioning equipment.

In this system, a medium on which installation information is recorded is provided to each apparatus to be installed. The installation information indicates at least one out of an installation position, an installation direction, an installation area, and an area use. A specific example of the medium on which the installation information is recorded is an RFID tag. Note that RFID is an abbreviation for radio frequency identifier.

The system is equipped with a server. The server manages each apparatus using the installation information of the apparatus.

Further, Patent Literature 1 discloses that information (wireless identification information and authentication password) necessary for connecting each apparatus to a wireless communication device in a building is recorded in the apparatus.

Patent Literature 1 also discloses that server connection information for accessing the server is recorded in the wireless communication device.

Patent Literature 1 also discloses that the installation information of each apparatus is recorded on a recording medium at the time of shipment of the apparatus.

CITATION LIST

Patent Literature

Patent Literature 1: JP 6493590

SUMMARY OF INVENTION

Technical Problem

An apparatus network system of the multi-drop scheme has problems as follows.

While the system has a high degree of freedom in construction, when a fault due to a construction defect occurs, the fault may be propagated to the entire system. Specifically, a potential difference and a potential decrease due to a short circuit or an earth fault. In addition, a signal-to-noise ratio decreases due to noise contamination in a wiring. As a result, a fault at one location may cause communication disability of all apparatuses on the system. In this case, it is impossible to narrow down a location where the fault occurs on the basis of a boundary between a communicable apparatus and a non-communicable apparatus. In other words, troubleshooting based on the confirmation of behavior of the apparatuses becomes impossible.

An apparatus network system sometimes has many wirings and a long wiring distance. Further, the apparatus network system is sometimes installed in a place where workability is poor, such as an attic. For this reason, if a fault due to a construction defect occurs, it may take a large number of man-hours to identify a cause.

In addition, knowledge and know-how are required to identify the cause. Therefore, construction operators who can identify the cause is limited.

A great deal of effort has been made by a construction operator to prevent a construction defect. However, due to factors such as a trend toward higher complexity of a construction case and a demand for a shorter construction period, the problem cannot always be solved by the effort of the construction operator alone.

A system disclosed in Patent Literature 1 cannot prevent a construction defect in network wiring. Moreover, the system cannot solve the problem of the apparatus network system of the multi-drop scheme.

An objective of the present invention is to make it possible to take a countermeasure against a fault in an apparatus network system while balancing cost and risk.

Solution to Problem

A network construction support system of the present invention proposes a layout of one or more units of construction assisting tools for a sake of an apparatus network system having a plurality of communication apparatuses connected by multi-drop.

Each of the construction assisting tools is an apparatus used for narrowing down a range that involves a cause location of a fault when the fault occurs in the apparatus network system.

The network construction support system includes:

a layout data generation unit to generate one or more pieces of layout data indicating a layout of the construction assisting tools;

an index value calculation unit to calculate a countermeasure cost and an estimated risk amount, for each layout data, the countermeasure cost increasing as a number of units of construction assisting tools increases, the estimated risk amount decreasing as the number of units of construction assisting tools increases and as a narrowed range by each construction assisting tool narrows;

a layout data judging unit to judge an appropriateness of the layout data for the apparatus network system, for each layout data, on a basis of the countermeasure cost, the estimated risk amount, and an allowable risk amount which is allowed for the apparatus network system; and a result output unit to output layout data judged to be appropriate for the apparatus network system.

Advantageous Effects of Invention

According to the present invention, it is possible to output layout data appropriate for an apparatus network system on the basis of a countermeasure cost, an estimated risk amount, and an allowable risk amount.

Therefore, by arranging one or more construction assisting tools in the apparatus network system according to the layout data, it is possible to take a countermeasure against a fault in the apparatus network system while balancing cost and risk.

DESCRIPTION OF EMBODIMENTS

Figure 1:
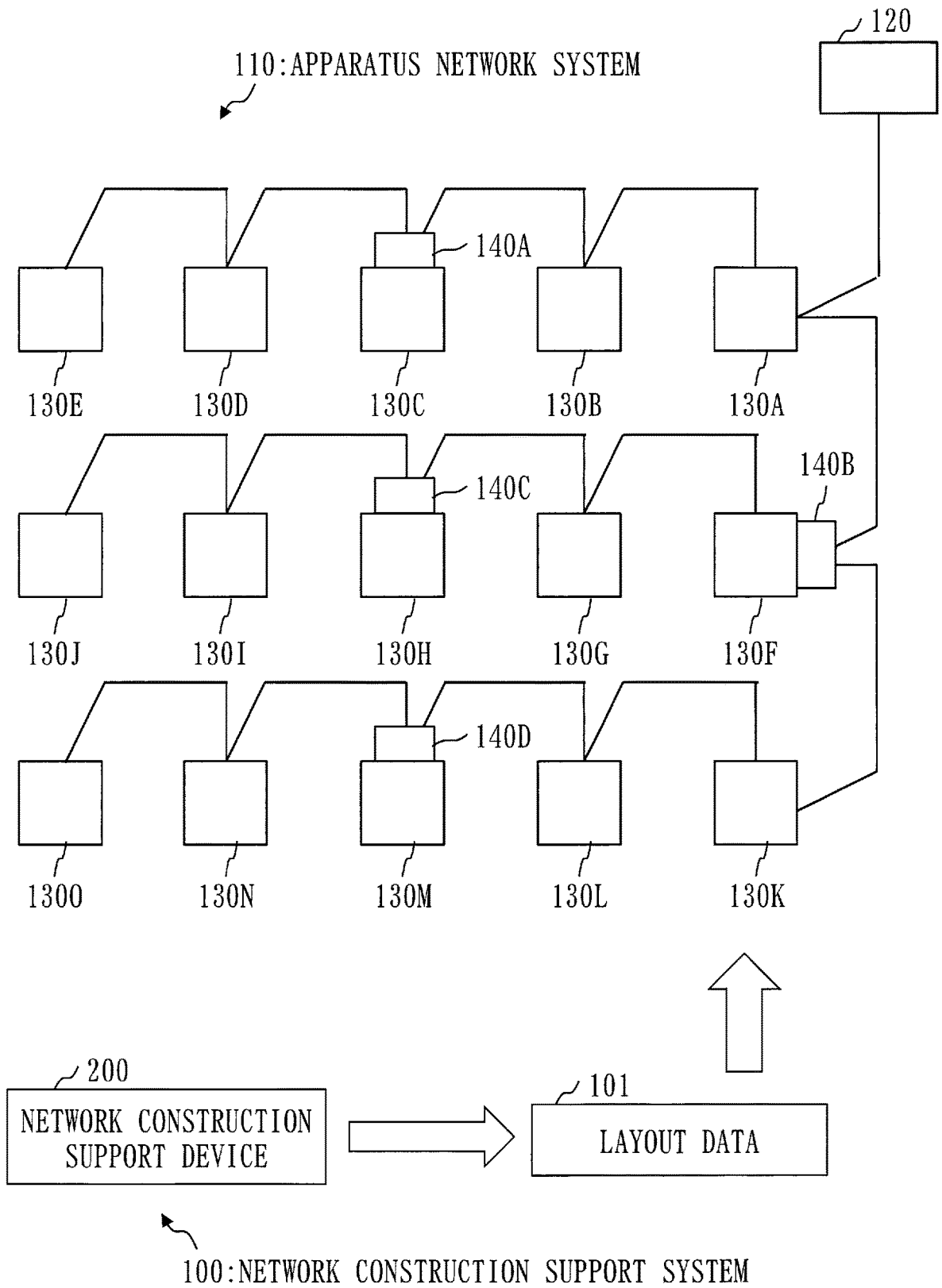
FIG. 1 is a configuration diagram of a network construction support system 100 and an apparatus network system 110 in Embodiment 1.

In embodiments and drawings, the same element or the equivalent element is denoted by the same reference symbol. Description of an element denoted by the same reference symbol as that for a described element will be appropriately omitted or simplified. Arrows in the drawings mainly indicate data flows or process flows.

Embodiment 1

A network construction support system 100 will be described with referring to FIGS. 1 to 11.

*Description of Configurations*

A configuration of the network construction support system 100 and a configuration of an apparatus network system 110 will be described with referring to FIG. 1.

The network construction support system 100 is a system that proposes a layout of one or more construction assisting tools 140 for the sake of the apparatus network system 110.

The construction assisting tool 140 is an apparatus used for narrowing down a range that involves a cause location of a fault when the fault occurs in the apparatus network system 110.

The range narrowed down with using the construction assisting tool 140 will be referred to as a "narrowed range". By investigating the narrowed range, a user can identify the cause location. The narrower the narrowed range, the easier identification of the cause location.

The apparatus network system 110 is provided with a controller 120 and a plurality of communication apparatuses 130. The apparatus network system 110 of FIG. 1 is provided with 15 units of communication apparatuses (130A to 130O).

The controller 120 is a computer to control the apparatus network system 110.

The communication apparatus 130 is an apparatus that performs communication.

The plurality of communication apparatuses 130 are connected to each other by multi-drop. In other words, the plurality of communication apparatus 130 are connected to a cross wiring.

The network construction support system 100 is provided with a network construction support device 200.

Note that the network construction support system 100 may be provided with two or more devices that replace the network construction support device 200. The controller 120 may function as the network construction support device 200.

The network construction support device 200 generates layout data 101.

The layout data 101 indicates a layout of one or more construction assisting tools 140.

Four construction assisting tools (140A to 140D) are installed in the apparatus network system 110 of FIG. 1 according to the layout indicated in the layout data 101.

Each construction assisting tool 140 is installed to control a connection state between a parent communication apparatus 130 and a child communication apparatus 130.

For example, each construction assisting tool 140 is externally attached to the parent communication apparatus 130. Note that each construction assisting tool 140 may be incorporated in the parent communication apparatus 130 or may be connected to a wiring between the parent communication apparatus 130 and the child communication apparatus 130.

A side closer to the controller 120 will be referred to as "upstream", and a side farther from the controller 120 will be referred to as "downstream". Each range partitioned by the construction assisting tools 140 will be referred to as a "wiring segment".

A parent communication apparatus 130 is a communication apparatus 130 located upstream of the wiring segment.

A child communication apparatus 130 is a most-upstream communication apparatus 130 in the wiring segment.

For example, the construction assisting tool 140A is installed for the communication apparatus 130C (parent communication apparatus 130). Specifically, the construction assisting tool 140A is externally attached to the communication apparatus 130C. The construction assisting tool 140A is used to control the connection state between the communication apparatus 130C and the communication apparatus 130D (child communication apparatus 130).

A configuration of the network construction support device 200 will be described with referring to FIG. 2.

The network construction support device 200 is a computer provided with hardware devices such as a processor 201, a memory 202, an auxiliary storage device 203, a communication device 204, and an input/output interface 205. These hardware devices are connected to each other via a communication line.

The processor 201 is an IC that performs computation processing, and controls the other hardware devices. For example, the processor 201 is a CPU.

Note that IC stands for Integrated Circuit.

Note that CPU stands for Central Processing Unit.

The memory 202 is a volatile or non-volatile storage device. The memory 202 is also called a main storage device or a main memory. For example, the memory 202 is a RAM. Data stored in the memory 202 is saved in the auxiliary storage device 203 as necessary.

Note that RAM stands for Random-Access Memory.

The auxiliary storage device 203 is a non-volatile storage device. For example, the auxiliary storage device 203 is a ROM, an HDD, or a flash memory. Data stored in the auxiliary storage device 203 is loaded into the memory 202 as necessary.

Note that ROM stands for Read-Only Memory.

Note that HDD stands for Hard Disk Drive.

The communication device 204 is a receiver/transmitter. For example, the communication device 204 is a communication chip or a NIC.

Note that NIC stands for Network Interface Card.

The input/output interface 205 is a port to which an input device and an output device are to be connected. For example, the input/output interface 205 is a USB terminal, the input device is a keyboard/mouse, and the output device is a display.

Note that USB stands for Universal Serial Bus.

The network construction support device 200 is provided with elements such as an information accepting unit 210, a layout data generation unit 220, an index value calculation unit 230, a layout data judging unit 240, and a result output unit 250. These elements are implemented by software.

In the auxiliary storage device 203, a network construction support program is stored which causes the computer to function as the information accepting unit 210, the layout data generation unit 220, the index value calculation unit 230, the layout data judging unit 240, and the result output unit 250. The network construction support program is loaded into the memory 202 and run by the processor 201.

Furthermore, an OS is stored in the auxiliary storage device 203. At least part of the OS is loaded into the memory 202 and run by the processor 201.

The processor 201 runs the network construction support program while running the OS.

Note that OS stands for Operating System.

Input/output data of the network construction support program is stored in a storage unit 290.

The memory 202 functions as the storage unit 290. Note that a storage device such as the auxiliary storage device 203, a register in the processor 201, and a cache memory in the processor 201 may function as the storage unit 290 in place of the memory 202, or together with the memory 202.

The network construction support device 200 may be provided with a plurality of processors that substitute for the processor 201. The plurality of processors share a function of the processor 201.

The network construction support program can be computer-readably recorded (stored) on a non-volatile recording medium such as an optical disk and a flash memory.

*Description of Operations*

A procedure of operations of the network construction support system 100 corresponds to a network construction support method. The procedure of operations of the network construction support system 100 also corresponds to a procedure of processing performed by the network construction support program.

The network construction support method will be described with referring to FIG. 3.

In step S10, the information accepting unit 210 accepts various types of information data such as configuration information data and inherent information data.

For example, the user utilizes a user interface to input the various types of information data to the network construction support device 200. Then, the information accepting unit 210 accepts the inputted various types of information data.

Each data included in the various types of information data is inputted in a graph format or a table format. Information that is a base of each data may be inputted with using CAD or the like, and the information accepting unit 210 may interpret the inputted information to generate each data.

Note that CAD stands for Computer Aided Design.

The configuration information data is data indicating a configuration (excluding the construction assisting tool 140) of the apparatus network system 110. For example, the configuration information data corresponds to construction drawing data of the apparatus network system 110.

The configuration information data includes an apparatus number, topology data, wiring length data, connection data, and so on.

The apparatus number is a number of units of communication apparatuses 130 included in the apparatus network system 110.

The topology data indicates topology of the apparatus network system 110. Specifically, the topology data is a tree structure graph expressing the configuration of the apparatus network system 110. The tree structure graph expresses, for example, a connection form of the communication apparatus 130.

The wiring length data indicates lengths of wirings between the controller 120 and the communication apparatuses 130, and lengths of wirings between the communication apparatuses 130.

The connection data indicates a wiring branch number of each communication apparatus 130, a screw fixing number of each communication apparatus 130, and so on. The wiring branch number corresponds to the number of communication apparatuses 130 located downstream of the communication apparatus 130. The screw fixing number is a number of screws fixed for connecting the wirings to the communication apparatus 130.

The inherent information data indicates information inherent to a case that is aimed at construction of the apparatus network system 110. This case will be referred to as a construction case. Work involved in the construction case will be referred to as construction work. The construction work includes work for installing the construction assisting tool 140. A mistake in the construction work will be referred to as a construction defect.

The inherent information data includes skill level data, loss data, management system data, and so on.

The skill level data indicates a skill level of each construction operator. The construction operator is a person who performs the construction work.

The loss data indicates an amount of loss incurred when a fault occurs to the apparatus network system 110 due to a construction defect.

The management system data indicates a client's management system for the construction case. The client is a person who ordered the construction case.

Figure 4:
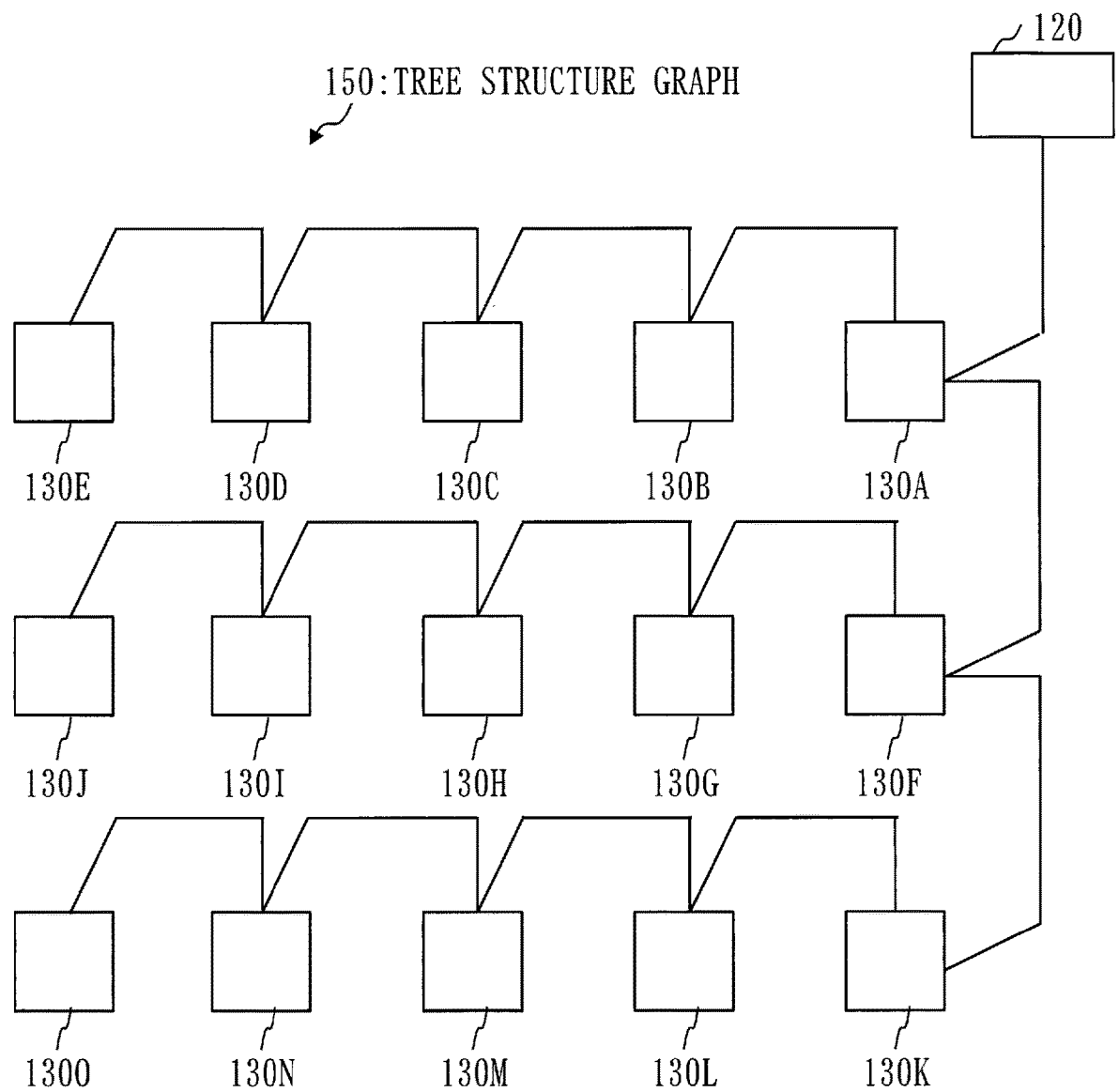
FIG. 4 is a tree structure graph 150 in Embodiment 1.

A tree structure graph 150 will be described with referring to FIG. 4.

The tree structure graph 150 is a graph that expresses the configuration of the apparatus network system 110 in a tree structure and is accepted as part (topology data) of the configuration information data.

A root node of the tree structure graph 150 expresses the controller 120.

Each node (excluding the root node) of the tree structure graph 150 expresses a communication apparatus 130.

Each edge of the tree structure graph 150 expresses a wiring between the controller 120 and a communication apparatus 130, or a wiring between communication apparatuses 130.

Figure 3:
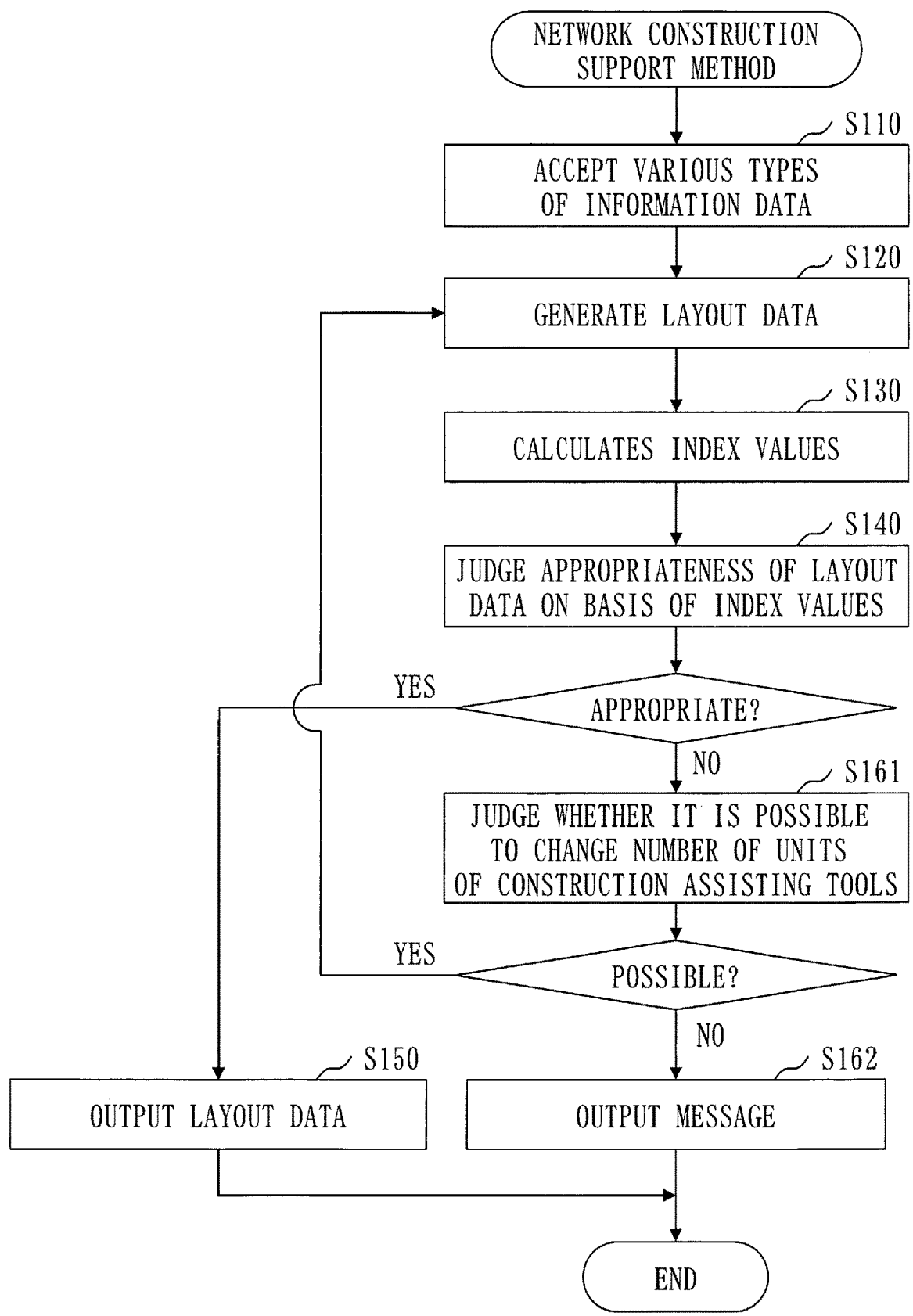
FIG. 3 is a flowchart of a network construction support method in Embodiment 1.

Back to FIG. 3, the explanation continues from step S120.

In step S120, the layout data generation unit 220 edits layout data in an initial state on the basis of the various types of information data so as to generate new layout data.

The layout data indicates a layout of the construction assisting tools 140 in the apparatus network system 110. For example, the layout data is formed by adding nodes expressing the construction assisting tools 140 to the tree structure graph of the apparatus network system 110.

The layout data in the initial state is stored in the storage unit 290 in advance.

The layout data generation unit 220 may generate layout data in the initial state on the basis of the configuration information data accepted in step S110. For example, the layout data generation unit 220 generates the layout data in the initial state by utilizing the tree structure graph.

The layout data in the initial state expresses a minimum layout or a maximum layout.

The minimum layout signifies that no construction assisting tools 140 are arranged.

The maximum layout signifies that the construction assisting tool 140 is arranged for each of all the communication apparatuses 130.

The layout data in the initial state may indicate a partial layout. The partial layout signifies that the construction assisting tool 140 is arranged for each of some communication apparatuses 130.

In a case where step S120 is executed after step S161 to be described later, the layout data generation unit 220 changes the number of units of construction assisting tools 140 to be indicated in the layout data. As a result, layout data is generated that indicates a number of units of construction assisting tools 140 different from the number of units of construction assisting tools 140 indicated in the last layout data.

In a case where the layout data in the initial state is layout data indicating a minimum layout, the number of units of construction assisting tools 140 is incremented by one from the number of units of construction assisting tools 140 indicated in the last layout data.

When the layout data in the initial state is layout data expressing a maximum layout, the number of units of construction assisting tools 140 is decremented by one from the number of units of construction assisting tools 140 expressed in the last layout data.

A procedure of a layout data generation process (S120) will be described later.

In step S130, the index value calculation unit 230 calculates index values such as a countermeasure cost, an estimated risk amount, and an allowable risk amount.

The countermeasure cost is a cost required for utilizing the construction assisting tools 140, and increases as the number of units of construction assisting tools 140 increases.

The estimated risk amount is a value corresponding to a magnitude of damages caused by the fault, and decreases as the number of units of construction assisting tools 140 increases and as the narrowed range by each construction assisting tool 140 narrows.

The allowable risk amount is a value corresponding to a magnitude of allowable damage (that is, a magnitude of acceptable damage), and is not changed by an increase/decrease of the construction assisting tools 140.

Each index value is calculated by executing a computation expression for the index value. A specific example of the computation expression for each index value will be described later.

In step S140, the layout data judging unit 240 judges an appropriateness of the layout data for the apparatus network system 110 on the basis of the index values such as the countermeasure cost, the estimated risk amount, and the allowable risk amount.

The appropriateness of the layout data is judged by executing a conditional expression indicating a relationship among the countermeasure cost, the estimated risk amount, and the allowable risk amount. A specific example of the conditional expression will be described later.

When it is judged that the layout data is appropriate for the apparatus network system 110, the processing proceeds to step S150.

When it is judged that the layout data is not appropriate for the apparatus network system 110, the processing proceeds to step S161.

In step S150, the result output unit 250 outputs the layout data.

For example, the result output unit 250 displays on the display a layout of the construction assisting tools 140 indicated in the layout data.

For example, the result output unit 250 transmits the layout data to the controller 120. The controller 120 receives the layout data and stores the received layout data.

For example, the result output unit 250 records the layout data on a recording medium connected to the network construction support device 200.

After step S150, the processing ends.

In step S161, the result output unit 250 judges whether it is possible to change the number of units of construction assisting tools 140.

In a case where the layout data indicates a layout of the construction assisting tools 140 for all the communication apparatuses 130, the construction assisting tools 140 cannot be increased.

In a case where the layout data indicates that no construction assisting tools 140 are arranged, the construction assisting tools 140 cannot be decreased.

When it is possible to change the number of units of construction assisting tools 140, the processing proceeds to step S120.

When it is not possible to change the number of units of construction assisting tools 140, the processing proceeds to step S162.

In step S162, the result output unit 250 outputs a message notifying that a construction assisting tool 140 appropriate for the apparatus network system 110 is not arranged.

For example, the result output unit 250 displays the message to the display.

After step S162, the processing ends.

Figure 5:
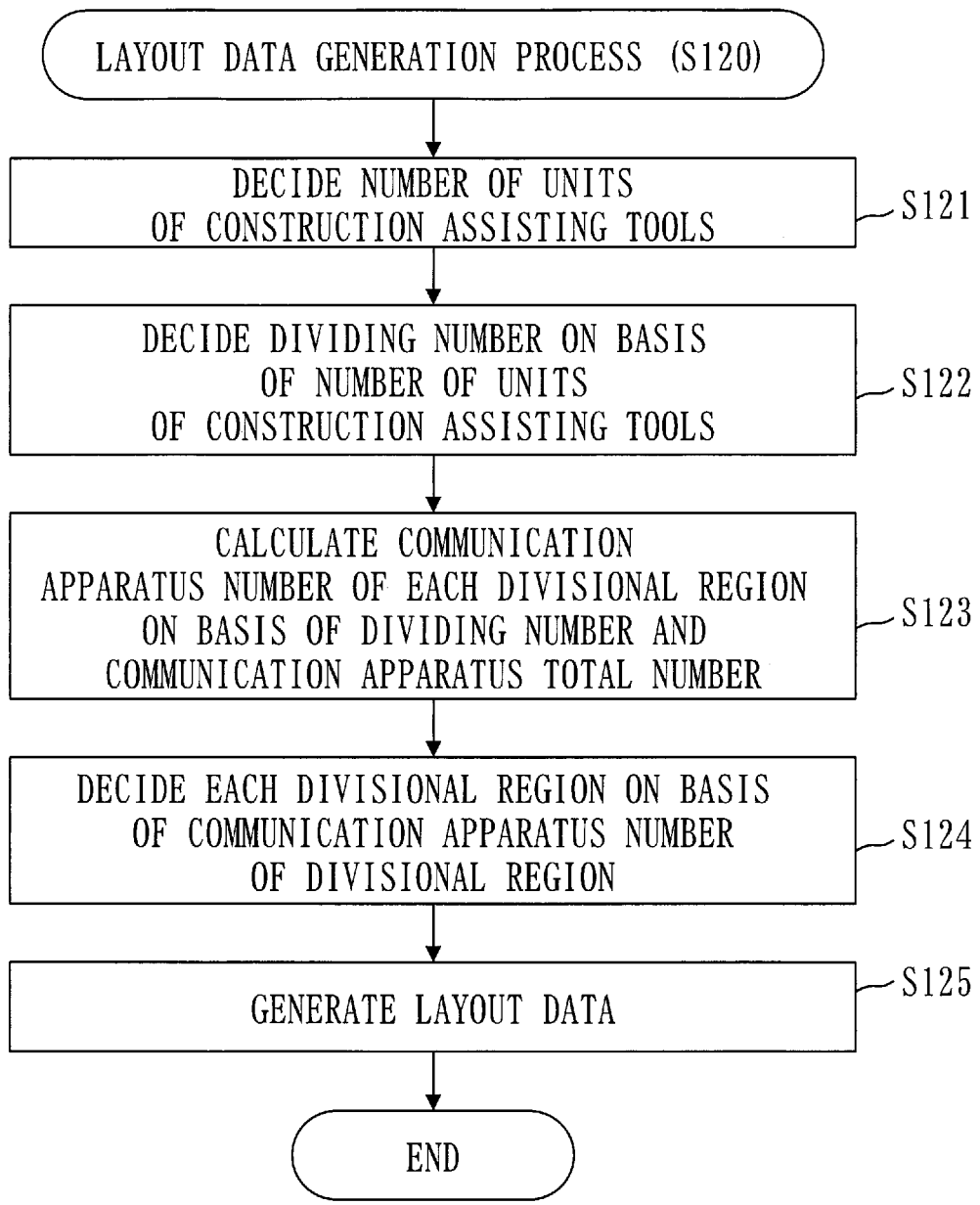
FIG. 5 is a flowchart of a layout data generation process (S120) in Embodiment 1.

The procedure of the layout data generation process (S120) will now be described with referring to FIG. 5.

In step S121, the layout data generation unit 220 decides the number of units of construction assisting tools 140.

The number of units of construction assisting tools 140 is decided as follows.

In a case where the layout data in the initial state is layout data indicating a minimum layout, the layout data generation unit 220 increments the number of units of construction assisting tools 140 by one from the last number of units. The initial value of the number of units is zero.

In a case where the layout data in the initial state is layout data indicating a maximum layout, the layout data generation unit 220 decrements the number of units of construction assisting tools 140 by one from the last number of units. The initial value of the number of units is the same as the number of units of communication apparatuses 130.

In step S122, the layout data generation unit 220 decides a dividing number on the basis of the number of units of construction assisting tools 140.

The dividing number is a value larger than the number of units of construction assisting tools 140 by one. For example, when the number of units of construction assisting tools 140 is 1, the dividing number is 2, and the tree structure graph of the apparatus network system 110 is partitioned into two regions.

In step S123, the layout data generation unit 220 calculates a communication apparatus number of each divisional region on the basis of the dividing number and a communication apparatus total number.

The communication apparatus total number is the number of units of communication apparatuses 130 involved in the apparatus network system 110.

The communication apparatus number of a divisional region is the number of units of communication apparatuses 130 involved in the divisional region.

In a case where all the communication apparatuses 130 are connected in series, the communication apparatus number of each divisional region is decided by values (a quotient and a residue) obtained by dividing the total number of communication apparatuses by the dividing number.

For example, assume that the dividing number is "7" and that the total number of communication apparatuses is "30". The quotient is "4", and the residue is "2". In this case, the communication apparatus numbers of seven divisional regions are "4, 4, 4, 4, 4, 5, 5".

In a case where the communication apparatuses 130 involved in the apparatus network system 110 are connected by a tree structure, the layout data generation unit 220 takes the tree structure into consideration.

If the tree structure is taken into consideration, for example, the communication apparatus number of each divisional region is decided by a value obtained by dividing the total number of communication apparatuses of each branch by the dividing number of the branch.

In step S124, the layout data generation unit 220 decides each divisional region on the basis of the communication apparatus number of the divisional region.

Specifically, the layout data generation unit 220 decides each divisional region such that the divisional region involves the number of units of communication apparatuses 130 calculated in step S123.

It is desirable that the number of units of communication apparatuses 130 involved in each divisional region coincides with the communication apparatus number of that divisional region. Note that it is not always possible to make the number of units of communication apparatuses 130 involved in each divisional region and the communication apparatus number of that divisional region coincide with each other.

A procedure of a divisional region decision process (S124) will be described later.

In step S125, the layout data generation unit 220 generates the layout data.

The layout data to be generated indicates a layout of the construction assisting tools 140 in which the apparatus network system 110 is divided among the divisional regions decided by in step S124.

Figure 6:
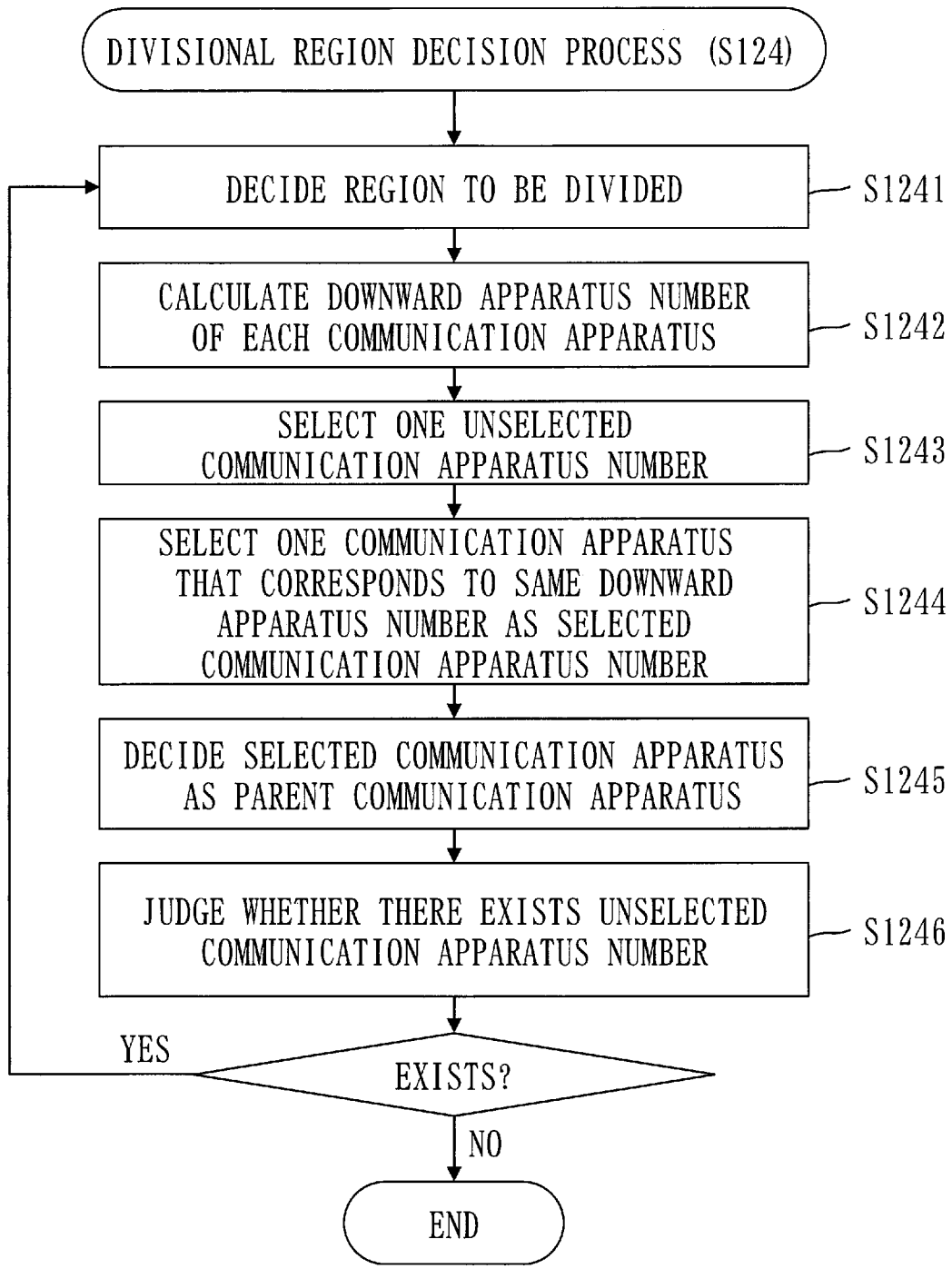
FIG. 6 is a flowchart of a divisional region decision process (S124) in Embodiment 1.

The procedure of the divisional region decision process (S124) will be described with referring to FIG. 6.

In step S1241, the layout data generation unit 220 decides a region to be divided. The region to be decided will be referred to as a division target region.

A first-time division target region is an entire region of the tree structure graph expressing the configuration of the apparatus network system 110.

Second- and subsequent-time division target regions are each a region that remains when decided divisional regions are excluded from the tree structure graph.

In step S1242, the layout data generation unit 220 calculates a downward apparatus number of each communication apparatus 130 of the division target region.

A downward apparatus number of a communication apparatus 130 is a number of units of communication apparatuses 130 located downstream of that communication apparatus 130.

In step S1243, the layout data generation unit 220 selects one unselected communication apparatus number out of the communication apparatus numbers calculated in step S123.

In step S1244, the layout data generation unit 220 selects one communication apparatus 130 that corresponds to the same downward apparatus number as the selected communication apparatus number.

If a communication apparatus 130 does not exist that corresponds to the same downstream apparatus number as the selected communication apparatus number, the layout data generation unit 220 selects one communication apparatus 130 that corresponds to the downward apparatus number that is the closest to the selected communication apparatus number.

In step S1245, the layout data generation unit 220 decides the selected communication apparatus 130 as a parent communication apparatus 130 of the divisional region that corresponds to the selected communication apparatus number.

Thus, a divisional region that corresponds to the selected communication apparatus number is decided. The decided divisional region is a region downstream of the parent communication apparatus 130.

In step S1246, the layout data generation unit 220 judges whether there exists an unselected communication apparatus number.

If there exists an unselected communication apparatus number, the processing proceeds to step S1241.

If there exists no unselected communication apparatus number, the processing ends.

In the above procedure, the layout data generation unit 220 performs division such that the node numbers of the divisional regions become as even as possible, on an assumption that the more even the node numbers (the communication apparatus numbers) of the divisional regions, the smaller the estimated risk amount.

Alternatively, the layout data generation unit 220 may perform division on the basis of another criterion. For example, a criterion is possible where evaluation values obtained on the basis of the numbers of nodes of the divisional regions and on the basis of the wiring lengths of the divisional regions are as even as possible. Also, a criterion is possible where the number of construction assisting tools 140 required for division is minimum.

An algorithm for division is not limited to the above procedure. For example, it is possible to apply an algorithm of a general graph division problem. Also, a method that minimizes the estimated risk amount by an evaluation function or a method for reducing a calculation amount may be possible.

A specific example of the computation expression (see step S130 of FIG. 3) for the estimated risk amount will now be described.

The computation expression for the estimated risk amount can be expressed by expression (1-1).

"$R_e$" expresses an estimated risk amount. For example, the estimated risk amount $R_e$ is a worst value in a 95% segment of a potential damage amount.

"P" expresses a penalty value for a construction defect. The larger the damage incurred by the construction defect, the larger the penalty value P. The penalty value P can be obtained from the inherent information data.

"C" expresses a complexity degree of the apparatus network system 110. The more complex the apparatus network system 110, the higher the complexity degree. A specific example of a computation expression for the complexity degree C. will be described later.

"S" expresses a skill level of the construction operator. The more skilled the construction operator, the higher the skill level S. The skill level S can be obtained from the inherent information data.

"$L_e(P, C)$" expresses an estimated damage amount. The estimated damage amount is an estimate of a damage amount incurred by the construction defect. The larger the penalty value P, the higher the estimated damage amount $L_e(P, C)$. The larger the complexity degree C., the higher the estimated damage amount $L_e(P, C)$. A function $L_e(\ )$ can be obtained from the inherent information data.

"$P_e(C, S)$" expresses a construction defect occurrence probability. The construction defect occurrence probability is a probability that a construction defect occurs. The higher the complexity degree C., the higher the construction defect occurrence probability $P_e(C, S)$. The lower the skill level S, the higher the construction defect occurrence probability $P_e(C, S)$. A value that expresses 100% is "1.0", and a value that expresses 0% is "0". A function $P_e(\ )$ can be obtained from inherent information data.

$$R_e = L_e(C, P) \times P_e(C, S) \quad (1\text{-}1)$$

In a case where a plurality of different types of damages occur, the index value calculation unit 230 may calculate a total sum of the estimated risk amount $R_e$ by executing a computation expression of each damage type.

The complexity degree C. can be expressed by expression (1-2).

Each of the wiring segments partitioned by the construction assisting tools 140 will be referred to as a "section".

"B" expresses an operation defect probability. The operation defect probability is a probability that a construction defect occurs in wiring work and screw fixing work. The larger the wiring branch number, the higher the operation defect probability B. The larger the screw fixing number, the higher the operation defect probability B. The operation defect probability B is obtained from the inherent information data.

Note that "$b_i$" express a sum of a wiring branch number of an i-th section and a screw fixing number of the i-th section. The sum number $b_i$ can be obtained from the configuration information data. Note that the sum number $b_i$ can be also calculated on the basis of the divisional region, the wiring branch numbers (whole), and the screw fixing numbers (whole).

"D" expresses a wiring defect probability. The wiring defect probability is a probability that a construction defect occurs in a wiring work. The longer the wiring, the higher the wiring defect probability D. The wiring defect probability D can be obtained from inherent information data.

"$I_i$" expresses a length of wiring of an i-th section. The wiring length $I_i$ can be obtained from the configuration information data. Note that the wiring length $I_i$ can be calculated on the basis of the divisional region, the wiring branch numbers (whole), and the screw fixing numbers (whole).

[Expression 1]

$$C = \sum_{\text{for all section } i} (1.0 + B)^{b_i}(1.0 + D)^{l_i} \quad (1\text{-}2)$$

The complexity degree C. increases exponentially as each of the sum number $b_i$ and the wiring length $I_i$ increases. The narrower the section, the smaller the sum number $b_i$ and the wiring length $I_i$. For this reason, as the construction assisting tools 140 increase and the wiring segments (sections) between the construction assisting tools 140 become narrow, the complexity degree C. decreases.

A specific example of a computation expression (see step S130 of FIG. 3) for the allowable risk amount will now be described.

The computation expression for the allowable risk amount can be expressed by expression (1-3).

"$R_a$" expresses the allowable risk amount.

"$L_a$" expresses an allowable damage amount. The allowable damage amount is an amount of damage that is allowable. For example, the allowable damage amount $L_a$ is a maximum damage amount in a 95% segment of a damage amount distribution formed by plotting a damage amount that may be incurred by a construction defect or the like. In that case, the allowable damage amount $L_a$ is synonymous with allowing occurrence of damage of an amount exceeding the allowable damage amount $L_a$ to a probability of 5.0% or less. The user may set the allowable damage amount $L_a$ properly. The allowable damage amount $L_a$ can be obtained from the inherent information data.

"M" expresses a management system value. The management system value indicates a degree of thoroughness of the management system for a construction case. The more thoroughly acceptance confirmation is performed in each construction process, the larger the management system value M is. A minimum value of the management system value M is "0.0". A maximum value of the management system value M is "1.0". The management system value M can be obtained from the inherent information data.

"A" expresses a wiring access value. The wiring access value indicates the accessibility to the wiring. The easier confirmation of the wiring, the higher the wiring access value A. The easier handling of the wire, the higher the wiring access value A. A minimum value of the wiring access value A is "0.0". A maximum value of the wiring access value A is "1.0". The wiring access value A can be obtained from the inherent information data.

"F(M, A)" expresses a correction coefficient for the construction defect damage amount. The smaller the management system value M, the smaller the correction coefficient F(M, A). The smaller the wiring access value A, the smaller the correction coefficient F(M, A). A function F( ) can be obtained from the inherent information data.

$$R_a = L_a \times F(M, A) \qquad (1\text{-}3)$$

A specific example of a computation expression for an installation cost which is a specific example of the countermeasure cost will now be described.

The computation expression for the installation cost can be expressed by expression (1-4).

"H" expresses the installation cost. The installation cost is a cost required for installing the construction assisting tool 140. As the construction assisting tools 140 to be installed increase, the installation cost H increases.

"$V_1$" is a value corresponding to a purchase cost. The purchase cost is a cost required for purchasing the construction assisting tools 140. For example, the cost value $V_1$ is a value obtained by normalizing the purchase cost into a default unit. The purchase cost or the cost value $V_1$ can be obtained from the inherent information data.

"$V_2$" is a value corresponding to a work man-hour. The work man-hour is a man-hour of the work of installing the construction assisting tools 140. For example, the man-hour value $V_2$ is a value obtained by normalizing the work man-hour into a default unit.

Note that "n" is a number of units of construction assisting tools 140.

$$H = (V_1 \times n) + (V_2 \times n) \qquad (1\text{-}4)$$

A specific example of a conditional expression (see step S140 of FIG. 3) for judging appropriateness of the layout data for the apparatus network system 110 will now be described.

When the conditional expression holds, the layout data is appropriate for the apparatus network system 110.

The conditional expression can be expressed by expression (1-5).

$$R_e + H \leq R_a \qquad (1\text{-}5)$$

Assume that an index value of each of the estimated risk amount $R_e$, the installation cost H. and the allowable risk amount $R_a$ is normalized by a default scale (unit). A specific example of the scale (unit) is "person-month" indicating a man-hour, or "yen" indicating a cost.

For example, the index value calculation unit 230 takes each index value as input and executes a normalization function, thereby normalizing the index value.

Supplement to Embodiment 1

A method of confirming operations of the apparatus network system 110 with using the construction assisting tools 140 will now be described.

Figure 7:
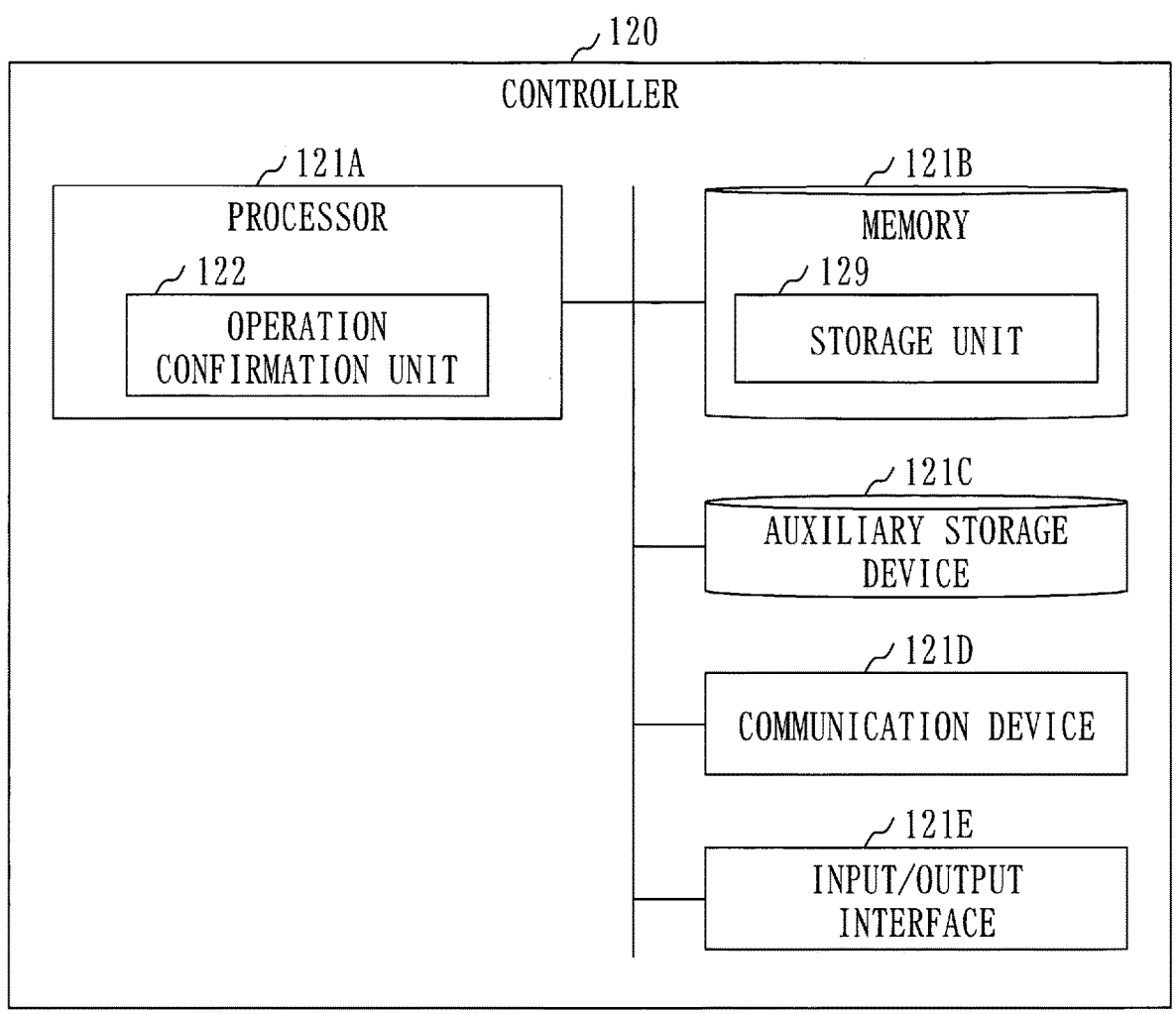
FIG. 7 is a configuration diagram of a controller 120 in Embodiment 1.

A configuration of the controller 120 will be described with referring to FIG. 7.

The controller 120 is a computer provided with hardware devices such as a processor 121A, a memory 121B, an auxiliary storage device 121C, a communication device 121D, and an input/output interface 121E. These hardware devices are connected to each other via a signal line.

The processor 121A is an IC that performs computation processing, and controls the other hardware devices. For example, the processor 121A is a CPU.

The memory 121B is a volatile or non-volatile storage device. The memory 121B is called a main storage device or a main memory as well. For example, the memory 121B is a RAM. Data stored in the memory 121B is saved in the auxiliary storage device 121C as necessary.

The auxiliary storage device 121C is anon-volatile storage device. For example, the auxiliary storage device 121C is a ROM, an HDD, or a flash memory. Data stored in the auxiliary storage device 121C is loaded into the memory 121B as necessary.

The communication device 121D is a receiver/transmitter. For example, the communication device 121D is a communication chip or a NIC.

The input/output interface 121E is a port to which an input device and an output device are to be connected. For example, the input/output interface 121E is a USB terminal.

The controller 120 is provided with an operation confirmation unit 122. The operation confirmation unit 122 is implemented by software.

In addition to the operation confirmation unit 122, the controller 120 is also provided with a system control unit (not illustrated) to control the apparatus network system 110.

The auxiliary storage device 121C stores an operation confirmation program to cause the computer to function as the operation confirmation unit 122. The operation confirmation program is loaded into the memory 121B and run by the processor 121A.

The auxiliary storage device 121C also stores an OS. At least part of the OS is loaded into the memory 121B and run by the processor 121A.

The processor 121A runs the operation confirmation program while running the OS.

Input/output data of the operation confirmation program is stored in a storage unit 129. For example, the layout data generated by the network construction support device 200 is stored in the storage unit 129.

The memory 121B functions as the storage unit 129. Alternatively, a storage device such as the auxiliary storage device 121C, a register in the processor 121A, and a cache memory in the processor 121A may function as the storage unit 129 in place of the memory 121B or together with the memory 121B.

The controller 120 may be provided with a plurality processors that substitute for the processor 121A. The plurality of processors share a function of the processor 121A.

The operation confirmation program can be computer-readably recorded (stored) on a non-volatile recording medium such as an optical disk and a flash memory.

Figure 8:
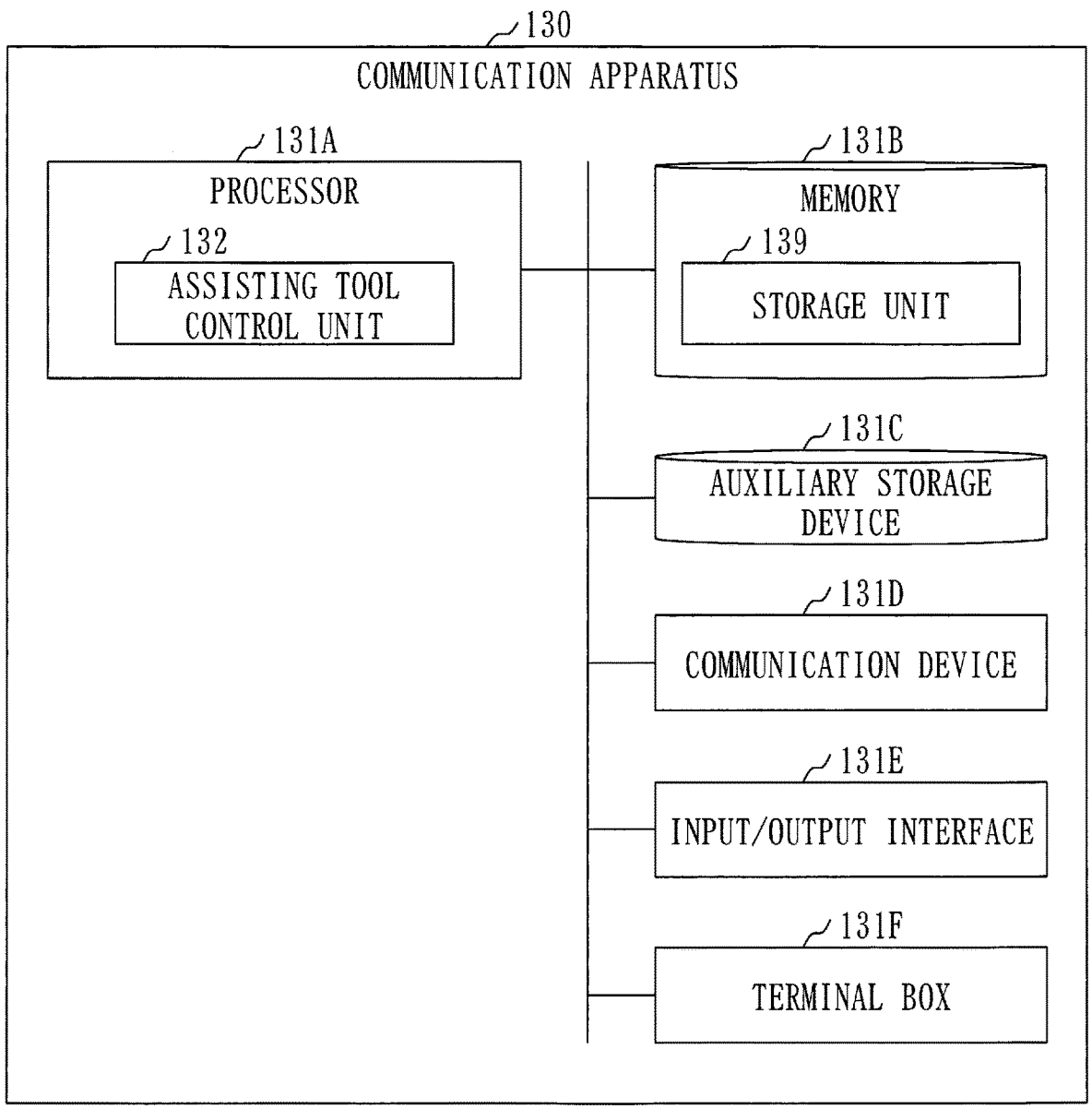
FIG. 8 is a configuration diagram of a communication apparatus 130 in Embodiment 1.

A configuration of the communication apparatus 130 will be described with referring to FIG. 8.

The communication apparatus 130 is a computer provided with hardware devices such as a processor 131A, a memory 131B, an auxiliary storage device 131C, a communication device 131D, an input/output interface 131E, and a terminal box 131F. These hardware devices are connected to each other via a signal line.

The processor 131A is an IC that performs computation processing, and controls the other hardware devices. For example, the processor 131A is a CPU.

The memory 131B is a volatile or non-volatile storage device. The memory 131B is called a main storage device or a main memory as well. For example, the memory 131B is a RAM. Data stored in the memory 131B is saved in the auxiliary storage device 131C as necessary.

The auxiliary storage device 131C is a non-volatile storage device. For example, the auxiliary storage device 131C is a ROM, an HDD, or a flash memory. Data stored in the auxiliary storage device 131C is loaded into the memory 131B as necessary.

The communication device 131D is a receiver/transmitter. For example, the communication device 131D is a communication chip or a NIC.

The input/output interface 131E is a port to which an input device and an output device are to be connected. For example, the input/output interface 131E is to be connected to the port of the construction assisting tool 140 via a signal line.

The terminal box 131F is a component to which the construction assisting tool 140 is to be attached.

The communication apparatus 130 is provided with an assisting tool control unit 132. The assisting tool control unit 132 is implemented by software.

In addition to the assisting tool control unit 132, the communication apparatus 130 is provided with a communication unit (not illustrated) to communicate with the controller 120 or another communication apparatus 130.

The auxiliary storage device 131C stores an assisting tool control program to cause the computer to function as the assisting tool control unit 132. The assisting tool control program is loaded into the memory 131B and run by the processor 131A.

The auxiliary storage device 131C also stores an OS. At least part of the OS is loaded into the memory 131B and run by the processor 131A.

The processor 131A runs the assisting tool control program while running the OS.

Input/output data of the assisting tool control program is stored in a storage unit 139.

The memory 131B functions as the storage unit 139. Alternatively, a storage device such as the auxiliary storage device 131C, a register in the processor 131A, and a cache memory in the processor 131A may function as the storage unit 139 in place of the memory 131B or together with the memory 131B.

The communication apparatus 130 may be provided with a plurality of processors that substitute for the processor 131A. The plurality of processors share a function of the processor 131A.

The assisting tool control program can be computer-readably recorded (stored) on a non-volatile recording medium such as an optical disk and a flash memory.

Figure 9:
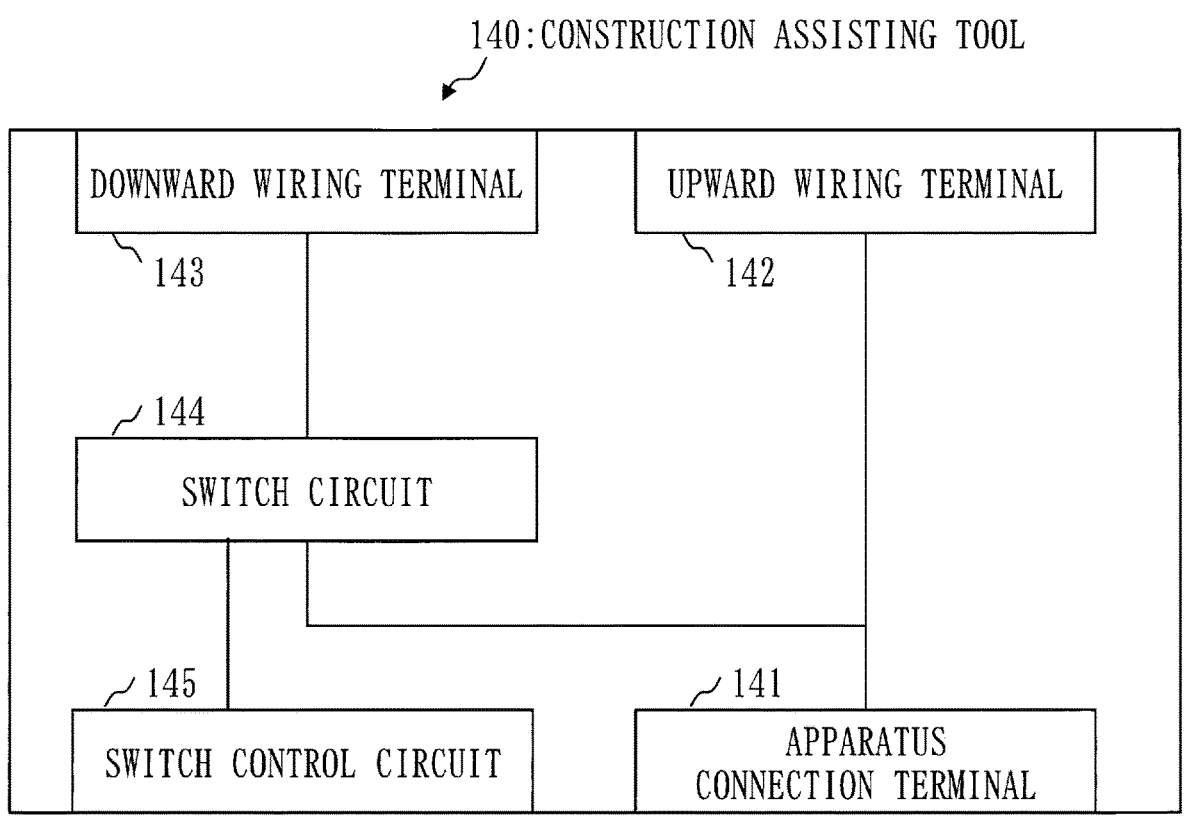
FIG. 9 is a configuration diagram of a construction assisting tool 140 in Embodiment 1.

A configuration of the construction assisting tool 140 will be described with referring to FIG. 9.

The construction assisting tool 140 is provided with hardware devices such as an apparatus connection terminal 141, an upward wiring terminal 142, a downward wiring terminal 143, a switch circuit 144, and a switch control circuit 145. These hardware devices are connected to each other via a signal line. For example, the switch circuit 144 is connected to the apparatus connection terminal 141, the downward wiring terminal 143, and the switch control circuit 145.

The apparatus connection terminal 141 is a component to attach the construction assisting tool 140 to the terminal box 131F of the communication apparatus 130.

The upward wiring terminal 142 is a component to which an upward wiring is to be connected. The upward wiring is an upstream-side wiring.

The downward wiring terminal 143 is a component to which a downward wiring is to be connected. The downward wiring is a downstream-side wiring.

The switch circuit 144 is a circuit for switching a connection state of a downward wiring to an upward wiring between a conductive state and a disconnected state. The conductive state is a state where the downward wiring is connected to the upward wiring and a signal moves between the upward wiring and the downward wiring. The disconnected state is a state where the downward wiring is disconnected from the upward wiring and no signal moves between the upward wiring and the downward wiring.

The switch control circuit 145 is a circuit to control the switch circuit 144. The switch control circuit 145 has a port. The port of the switch control circuit 145 is connected to a port of the communication apparatus 130 via a signal line.

An operation confirmation method will be described with referring to FIGS. 10 and 11.

This operation confirmation method is a method that confirms the operations of the apparatus network system 110 with utilizing the construction assisting tool 140.

With this operation confirmation method, in a case where a fault occurs in the apparatus network system 110, a range that involves a cause location of the fault can be narrowed down.

Processes of this operation confirmation method are mainly executed by the controller 120.

In step S201, the operation confirmation unit 122 puts all construction assisting tools 140 into the disconnected state.

As a method of putting all the construction assisting tools 140 into the disconnected state, there are: (1) a method of putting each construction assisting tool 140 into the disconnected state in advance at the time of shipping or before installation; and (2) a method of transmitting a disconnection instruction from the operation confirmation unit 122 to each communication apparatus 130. The method (2) will be described below.

All the construction assisting tools 140 are put into the disconnected state as follows.

The operation confirmation unit 122 transmits the disconnection instruction to each communication apparatus 130. Each communication apparatus 130 receives the connection instruction.

In each communication apparatus 130 to which the apparatus connection terminal 141 is attached, the assisting tool control unit 132 inputs the disconnection signal to the construction assisting tool 140.

In each construction assisting tool 140, the switch control circuit 145 controls the switch circuit 144 according to the disconnection signal. The switch circuit 144 switches the connection state of the downward wiring with respect to the upward wiring, to the disconnected state.

With step S201, only each communication apparatus 130 located in a wiring segment which the controller 120 belongs to can communicate with the controller 120.

The wiring segment where the controller 120 can communicate with each communication apparatus 130 will be referred to as a "communication segment". The communication segment is discriminated on the basis of the layout of the construction assisting tool 140 indicated in the layout data.

In step S202, the operation confirmation unit 122 transmits an address request to each communication apparatus 130. The address request is data for requesting an address that identifies the communication apparatus 130.

After step S202, each communication apparatus 130 that has received the address request transmits an address response to the controller 120. The address request includes an address of the communication apparatus 130.

When the address response is transmitted from each communication apparatus 130 to the controller 120, the operation confirmation unit 122 receives the address response of each communication apparatus 130.

In step S203, the operation confirmation unit 122 judges whether the address response was able to be received from each communication apparatus 130.

If the address response was able to be received from each communication apparatus 130, the processing proceeds to step S211.

If the address response was not able to be received from each communication apparatus 130, the processing proceeds to step S204.

In step S204, the operation confirmation unit 122 identifies a cause segment on the basis of the layout data and the communication segment. The cause segment is a wiring segment that involves a fault cause location.

Then, the operation confirmation unit 122 outputs data indicating the cause segment. For example, the operation confirmation unit 122 displays on the display a tree structure graph of the apparatus network system 110 such that the cause segment can be discriminated.

Specifically, the cause segment is a wiring segment where a communication apparatus 130 that did not transmit an address response is located.

After step S204, the processing proceeds to step S221.

In step S211, the operation confirmation unit 122 judges whether there exists, in the received address response, an address that was responded for the first time.

If there exists an address responded for the first time, the processing proceeds to step S213.

If there exists no address responded for the first time, the processing proceeds to step S212. In a case where a sender of the address response is the communication apparatus 130 of a terminal end, the processing proceeds to step S221.

In step S212, the operation confirmation unit 122 identifies the cause segment on the basis of the layout data and the communication segment. Then, the operation confirmation unit 122 outputs data indicating the cause segment. For example, the operation confirmation unit 122 displays on the display the tree structure graph of the apparatus network system 110 such that the cause segment can be discriminated.

Specifically, the cause segment is a wiring segment downstream of the construction assisting tool 140 which is the sender of the address response.

After step S212, the processing proceeds to step S221.

In step S213, the operation confirmation unit 122 selects, from among addresses that have been responded for the first time, an address responded by a communication apparatus 130 to which a construction assisting tool 140 is attached. The communication apparatus 130 to which the construction assisting tool 140 is attached is discriminated on the basis of the layout data.

Then, the operation confirmation unit 122 places each selected address into a search queue.

In step S221, the operation confirmation unit 122 judges whether there exists an address in the search queue.

If there exists an address in the search queue, the processing proceeds to step S222.

If there exists no address in the search queue, the processing ends.

In step S222, the operation confirmation unit 122 extracts one address from the search queue.

In step S223, the operation confirmation unit 122 transmits a conduction instruction to the extracted address.

In the communication apparatus 130 that has received the conduction instruction, the assisting tool control unit 132 inputs a conduction signal to the construction assisting tool 140.

In the construction assisting tool 140 to which the conduction signal has been inputted, the switch control circuit 145 controls the switch circuit 144, and the switch circuit 144 switches the connection state of the downward wiring with respect to the upstream wiring, to the conductive state.

With step S223, a wiring segment downstream of the communication apparatus 130 that has received the conduction instruction joins the communication segment.

After step S223, the processing proceeds to step S202.

In a case where it is confirmed by the above operation confirmation method that the apparatus network system 110 is normal, the controller 120 puts all construction assisting tools 140 into the conductive state.

All the construction assisting tool 140 are put into the conductive state as follows.

The controller 120 transmits a conduction instruction to each communication apparatus 130. Each communication apparatus 130 receives the conduction instruction.

In each communication apparatus 130 to which the apparatus connection terminal 141 is attached, the assisting tool control unit 132 inputs a conduction signal to the construction assisting tool 140.

In each construction assisting tool 140, the switch control circuit 145 controls the switch circuit 144 according to the conduction signal. The switch circuit 144 switches the connection state of the downward wiring with respect to the upstream wiring, to the conductive state.

After all the construction assisting tool 140 are put into the conductive state, the apparatus network system 110 starts operation.

Summary of Embodiment 1

An installation spacing of the construction assisting tool 140 corresponds to a narrowing granularity. For example, assume that the construction assisting tool 140 is installed on all the communication apparatuses 130. When finding a construction defect location that causes a fault, it is possible to estimate that the wiring segment of one pair of adjacent communication apparatuses 130 would be the relevant area. The operator only needs to confirm this relevant wiring segment. Therefore, the countermeasure man-hour can be reduced when compared to a case where there are no construction assisting tools 140.

However, use of a construction assisting tool involves a trade-off as follows.

The larger the number of employed construction assisting tools 140 is, the quicker an occurred fault is dealt with, and the more the risk is reduced. On the other hand, a product cost, the construction man-hour, and an operation confirmation time increase. Accordingly, it may be possible that a sufficient investment effect cannot be obtained.

The smaller the number of employed construction assisting tools 140, the less the production cost, the construction man-hour, and the operation confirmation time. On the other hand, a risk would become large if a fault should occur.

Therefore, in view of the situation of each construction case, the network construction support device 200 takes the cost, the man-hour, and the risk into consideration to find an optimum layout of the construction assisting tools 140.

For this purpose, the network construction support device 200 estimates how likely it is that a construction defect may occur in each construction case, and compares an estimated risk amount and an allowable risk amount.

Then, the network construction support device 200 finds a layout (an installation number and installation locations) of the construction assisting tools 140 such that a sum of the estimated risk amount and a countermeasure cost is equal to or smaller than the allowable risk amount and that the countermeasure cost is as small as possible. For this purpose, the network construction support device 200 finds estimated risk amounts for a plurality of patterns of layouts. That is, the network construction support device 200 simulates the plurality of patterns of layouts.

Note that since decision of the optimum layout corresponds to an NP-hard combination optimization problem, it is not easy, in terms of calculation amount, to find a strict optimum solution. Therefore, the network construction support device 200 finds an approximate solution to reduce the calculation amount. Decision of the optimum layout according to Embodiment 1 involves decision of an approximate solution.

The apparatus network system 110 is provided with the plurality of communication apparatuses 130, one or more construction assisting tools 140, and the controller 120.

The construction assisting tool 140 switches a connection state of two communication apparatuses 130 out of the plurality of communication apparatuses 130, between the conductive state and the disconnected state.

The controller 120 instructs the construction assisting tool 140 to switch the connection state of the two communication apparatuses 130 between the conductive state and the disconnected state.

Effect of Embodiment 1

With Embodiment 1, an effect of ensuring construction quality of the apparatus network system of the multi-drop scheme can be obtained. From a standpoint of a contractor, an effect of suppressing a risk of process delay can be obtained. From a standpoint of the construction operator, an effect of suppressing a risk (additional man-hours and compensation for damages) caused by occurrence of construction defects can be obtained.

According to Embodiment 1, it is possible to obtain a layout of the construction assisting tool 140 that optimizes a balance of the installation cost accompanying installation of the construction assisting tools 140 and a risk of construction mistake that can occur when constructing the apparatus network system 110.

Assume that the construction assisting tools 140 are not installed in the apparatus network system 110 in advance, and only those construction assisting tools 140 that are judged necessary for the network apparatuses (communication apparatuses 130) or are judged necessary for wirings in the vicinities of the network apparatuses are installed afterwards.

Embodiment 1 makes it easy, in the apparatus network system of the multi-drop scheme, to narrow down a range that involves a cause location of a fault incurred by a construction defect.

By installing the construction assisting tools 140 in the apparatus network system 110, the fault location of the apparatus network system 110 can be narrowed down.

Installation of the construction assisting tools 140 may be helpful for dealing with a construction fault that should occur. On the other hand, this increases the installation cost according to an installation number of the construction assisting tools 140. Therefore, it is not always good to install many construction assisting tools 140.

Hence, the network construction support device 200 estimates how likely it is that a construction defect may occur in each construction case so as to quantify a damage that can finally occur, thereby finding the risk amount. Then, the network construction support device 200 finds an optimum installation number of construction assisting tools 140 and optimum locations where the construction assisting tools 140 are to be installed, so that the risk amount of the damage can be suppressed to an allowable risk amount or less.

Embodiment 1 is particularly effective as a countermeasure against a fault that may propagate to the entire apparatus network system due to a construction defect occurring in one location.

Embodiment 1 is also effective for an apparatus network system of a multi-drop/free-topology scheme, in addition to the apparatus network system of the multi-drop scheme.

Embodiment 2

A mode where an operation confirmation cost of an apparatus network system 110 is taken into consideration will be described mainly regarding its difference from Embodiment 1.

\*\*\*Description of Configuration\*\*\*

A configuration of the apparatus network system 110 will be described.

One or more construction assisting tools 140 are installed in the apparatus network system 110 in advance. For example, a construction assisting tool 140 is installed on each of all communication apparatuses 130 in advance. Alternatively, a construction assisting tool 140 is installed on each of many communication apparatuses 130 in advance. Among the installed construction assisting tools 140, some construction assisting tools 140 are activated and put to use.

Figure 2:
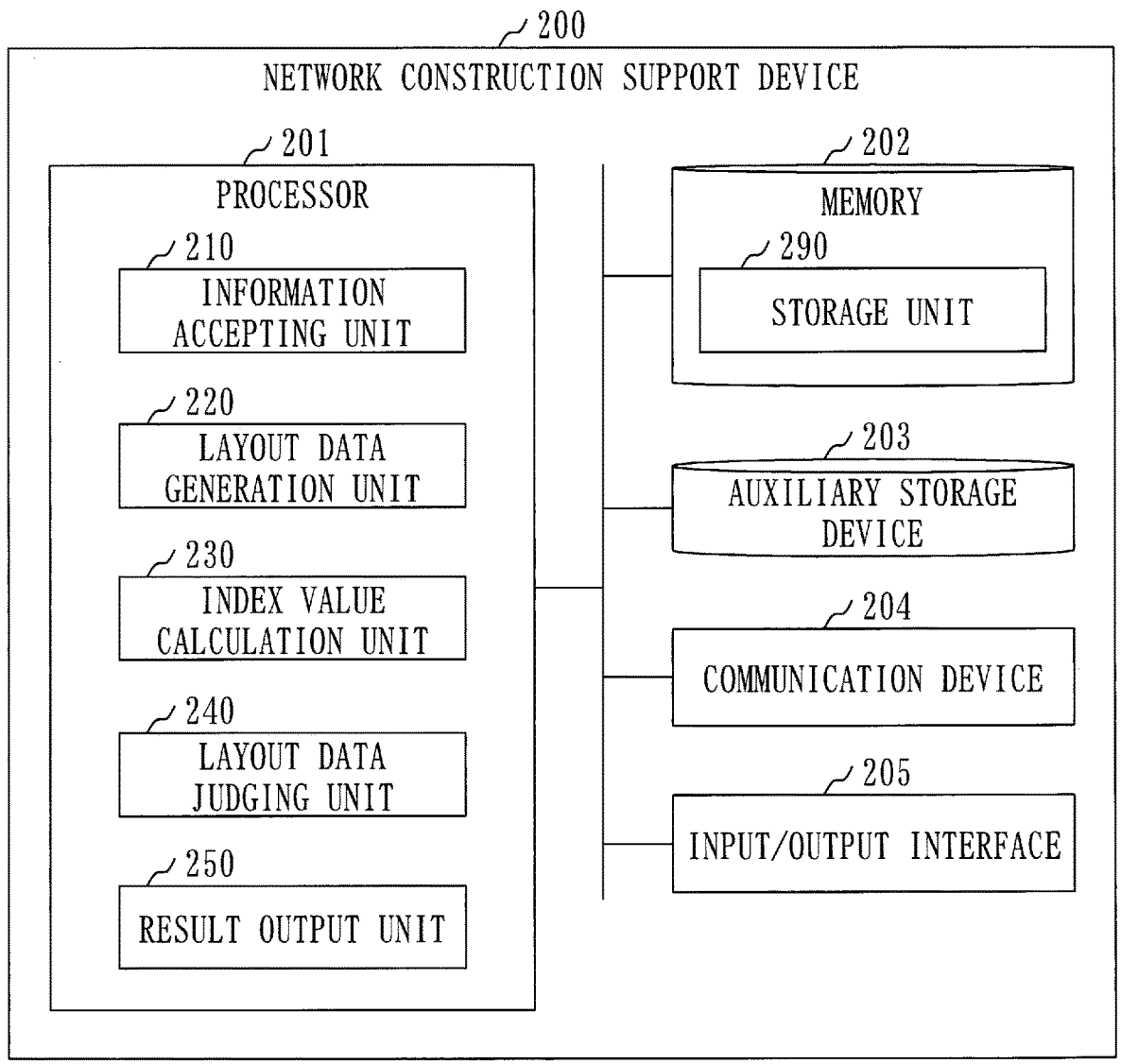
FIG. 2 is a configuration diagram of a network construction support device 200 in Embodiment 1.

A configuration of a network construction support system 100 is the same as the configuration in Embodiment 1 (see FIGS. 1 and 2).

\*\*\*Description of Operations\*\*\*

A procedure of a network construction support method is the same as the procedure in Embodiment 1 (see FIG. 3).

Note that the network construction support method in Embodiment 2 is different from the method in Embodiment 1 in the following respects.

In step S110, configuration information data indicates the configuration of apparatus network system 110 including the construction assisting tools 140 installed in the apparatus network system 110.

In step S120, layout data indicates a layout of the construction assisting tools 140 which are used for operation confirmation of the apparatus network system 110.

In step S130, an index value calculation unit 230 calculates an operation confirmation cost as a countermeasure cost. Specifically, the index value calculation unit 230 executes a computation expression for the operation confirmation cost. Various types of information used for executing the computation expression are included in, for example, the configuration information data.

The operation confirmation cost is a cost required for confirming operations of the apparatus network system 110 with using the construction assisting tools 140. For example, the operation confirmation cost is a sum of human costs for time required for operation confirmation of the apparatus network system 110.

The operation confirmation cost is a specific example of the countermeasure cost.

In step S140, a conditional expression for judging appropriateness of the layout data indicates a relationship among the operation confirmation cost, an estimated risk amount, and an allowable risk amount.

The conditional expression can be expressed by expression (2-1).

Note that "T" expresses the operation confirmation cost. The more the construction assisting tools 140 to be used, the higher the operation confirmation cost T.

$$R_e + T \le R_a \qquad (2\text{-}1)$$

By equation (2-1), the conditional expression for suppressing the operation confirmation cost is set.

In Embodiment 2, it is possible to confirm the operations of the apparatus network system 110 by switching use of each construction assisting tool 140 between ON and OFF. Therefore, it may be possible to review the condition by setting a slightly high allowable risk amount $R_a$. That is, the computation expression for the allowable risk amount $R_a$ may be revised.

Figure 12:
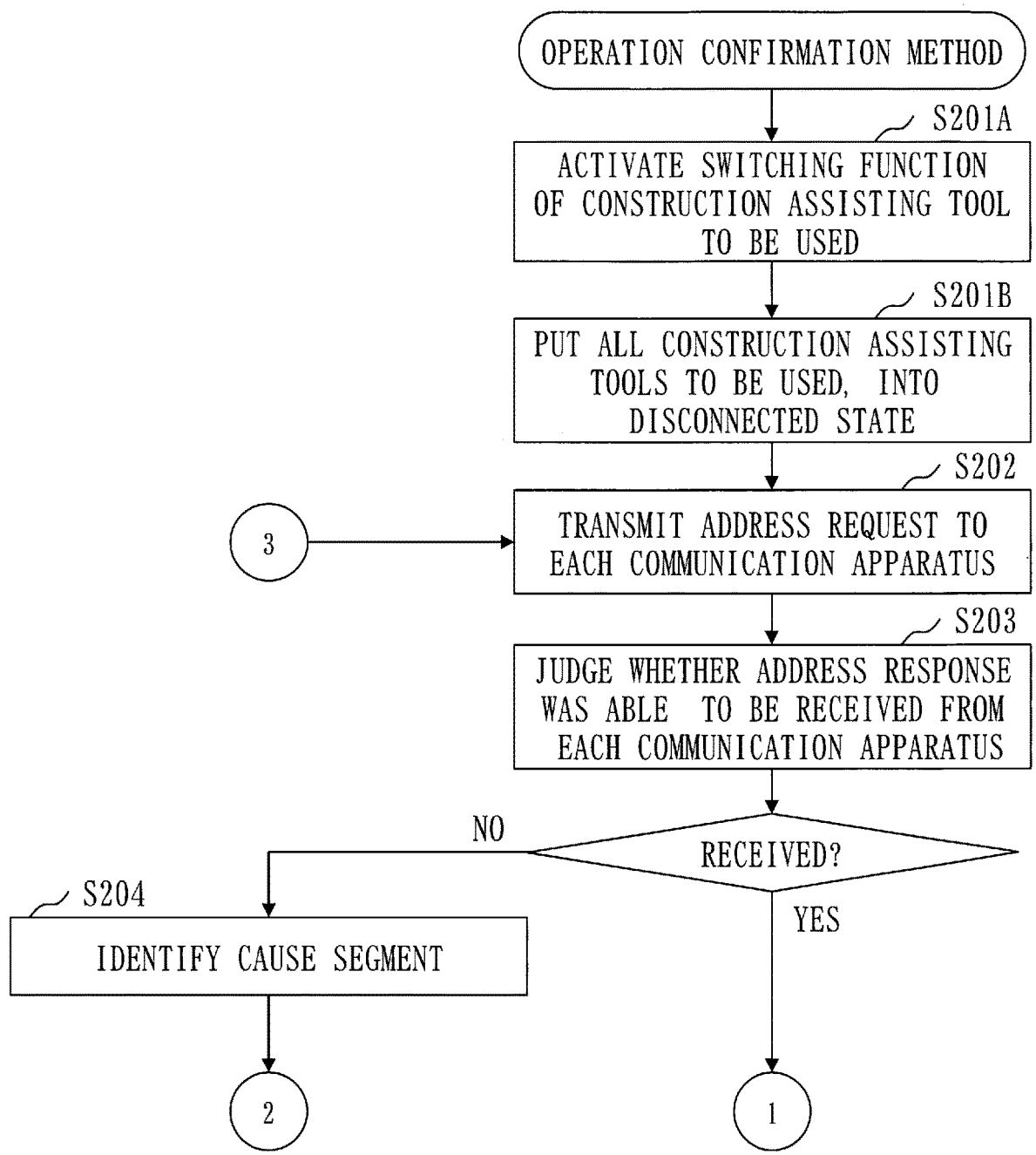
FIG. 12 is a flowchart of an operation confirmation method in Embodiment 2.
Figure 13:
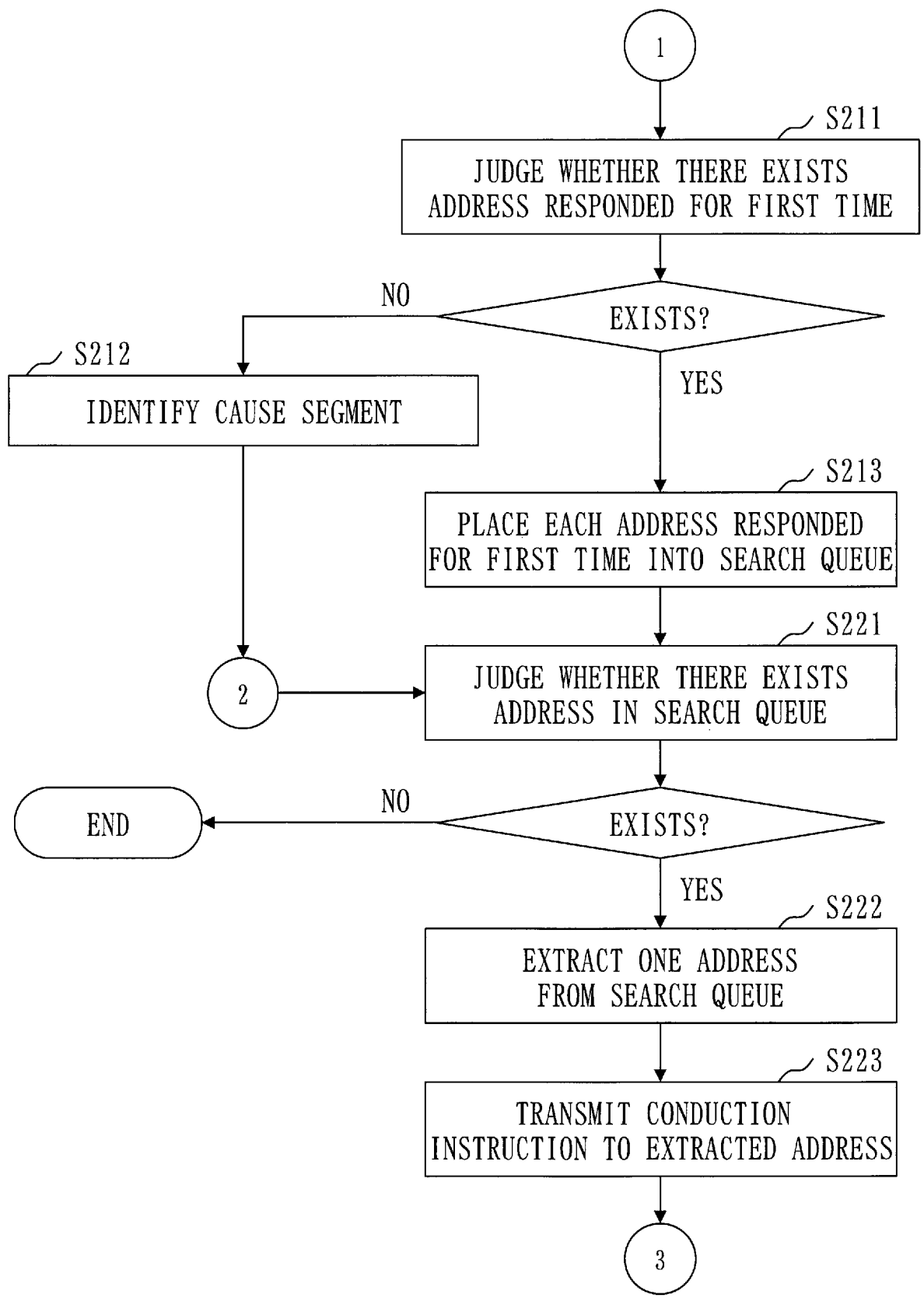
FIG. 13 is a flowchart of the operation confirmation method in Embodiment 2.

An operation confirmation method will be described with referring to FIGS. 12 and 13.

In step S201A, an operation confirmation unit 122 activates each construction assisting tool 140 indicated in the layout data, that is, each construction assisting tool 140 to be used. Also, the operation confirmation unit 122 inactivates each construction assisting tool 140 which is not to be used.

Activation (or inactivation) of the construction assisting tool 140 signifies activation (or inactivation) of a switching function of the construction assisting tool 140.

A connection state of the activated construction assisting tool 140 can be switched between a conductive state and a disconnected state.

A connection state of the inactivated construction assisting tool 140 is fixed at the conductive state.

Each construction assisting tool 140 to be used is activated (or inactivated) as follows.

The operation confirmation unit 122 generates an activation instruction on the basis of the layout data and transmits the activation instruction to each communication apparatus 130. The activation instruction involves information that identifies the construction assisting tool 140 to be used. For example, the activation instruction includes an identifier of a communication apparatus 130 to which the construction assisting tool 140 to be used is attached.

Each communication apparatus 130 receives the activation instruction. In each communication apparatus 130, an assisting tool control unit 132 judges, on the basis of the information involved in the activation instruction, whether the construction assisting tool 140 attached to the communication apparatus 130 is a construction assisting tool 140 to be used.

If the construction assisting tool 140 attached to the communication apparatus 130 is a construction assisting tool 140 to be used, the assisting tool control unit 132 activates the construction assisting tool 140. Specifically, the assisting tool control unit 132 inputs an activation signal to the construction assisting tool 140. In each construction assisting tool 140 to which the activation signal has been inputted, a switch control circuit 145 saves an activation flag. After that, the switch control circuit 145 that stores the activation flag controls a switch circuit 144 according to a disconnection signal or a conduction signal.

If the construction assisting tool 140 attached to the communication apparatus 130 is not a construction assisting tool 140 to be used, the assisting tool control unit 132 inactivates the construction assisting tool 140. Specifically, the assisting tool control unit 132 inputs an inactivation signal to the construction assisting tool 140. In each construction assisting tool 140 to which the inactivation signal has been inputted, the switch control circuit 145 saves an inactivation flag. Also, the switch control circuit 145 controls the switch circuit 144, and the switch circuit 144 switches the connection state of a downward wiring with respect to an upward wiring, to a conductive state. After that, the switch control circuit 145 that stores the inactivation flag does not control the switch circuit 144 even if a disconnection signal or a conduction signal is inputted.

In step S201B, the operation confirmation unit 122 puts all the construction assisting tools 140 to be used, into a disconnected state.

All the construction assisting tools 140 to be used are put into the disconnected state as follows.

The operation confirmation unit 122 transmits a disconnection instruction to each communication apparatus 130. Each communication apparatus 130 receives the disconnection instruction.

In each communication apparatus 130, the assisting tool control unit 132 inputs the disconnection signal to the construction assisting tool 140.

In each construction assisting tool 140 that stores the activation flag, the assisting tool control unit 132 controls the switch circuit 144 according to the disconnection signal, and the switch circuit 144 switches a connection state between an upward wiring and a downward wiring, to a disconnected state.

In each construction assisting tool 140 that stores the inactivation flag, the assisting tool control unit 132 does not control the switch circuit 144, according to the disconnection signal.

Figure 10:
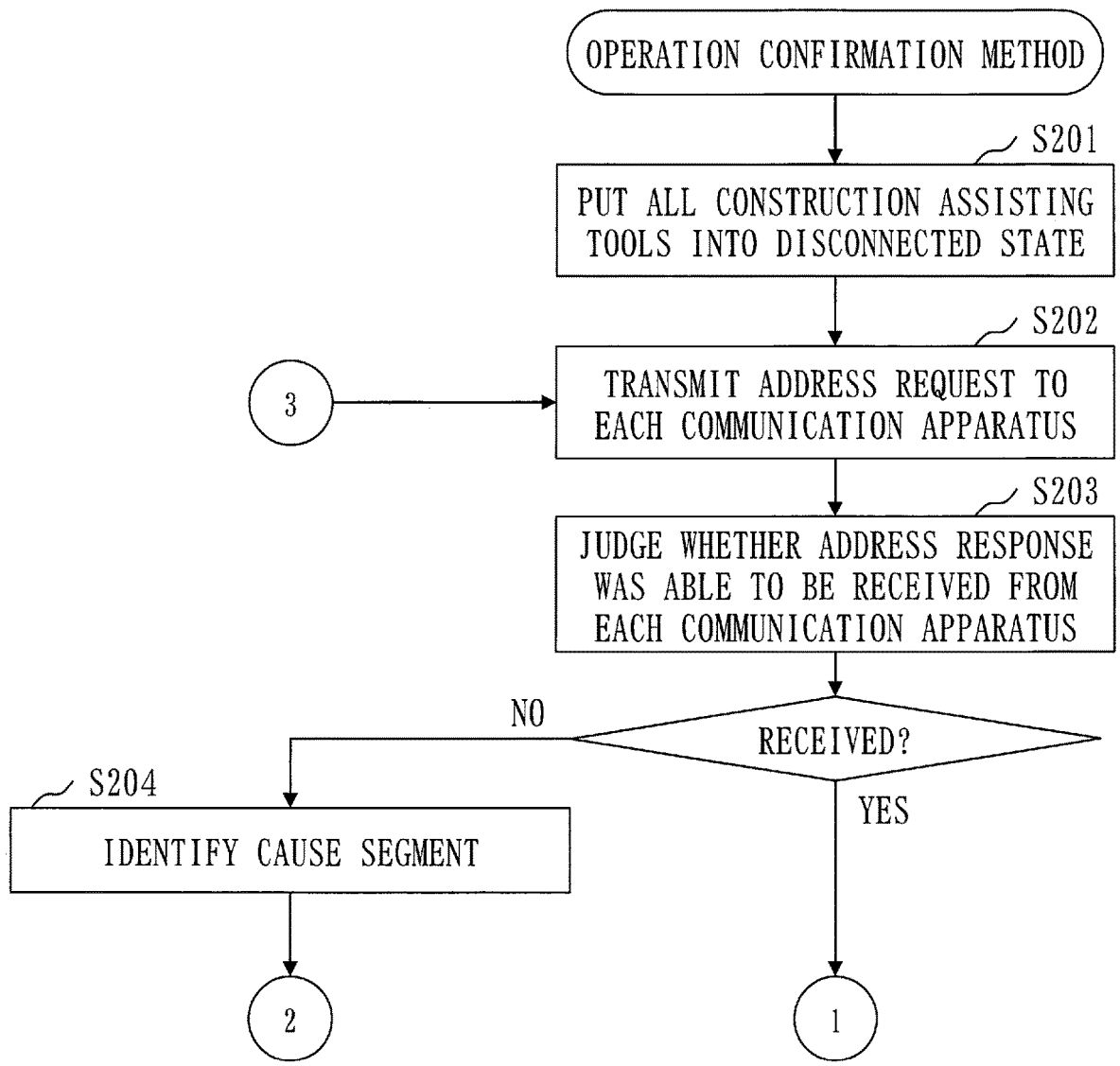
FIG. 10 is a flowchart of an operation confirmation method in Embodiment 1.
Figure 11:
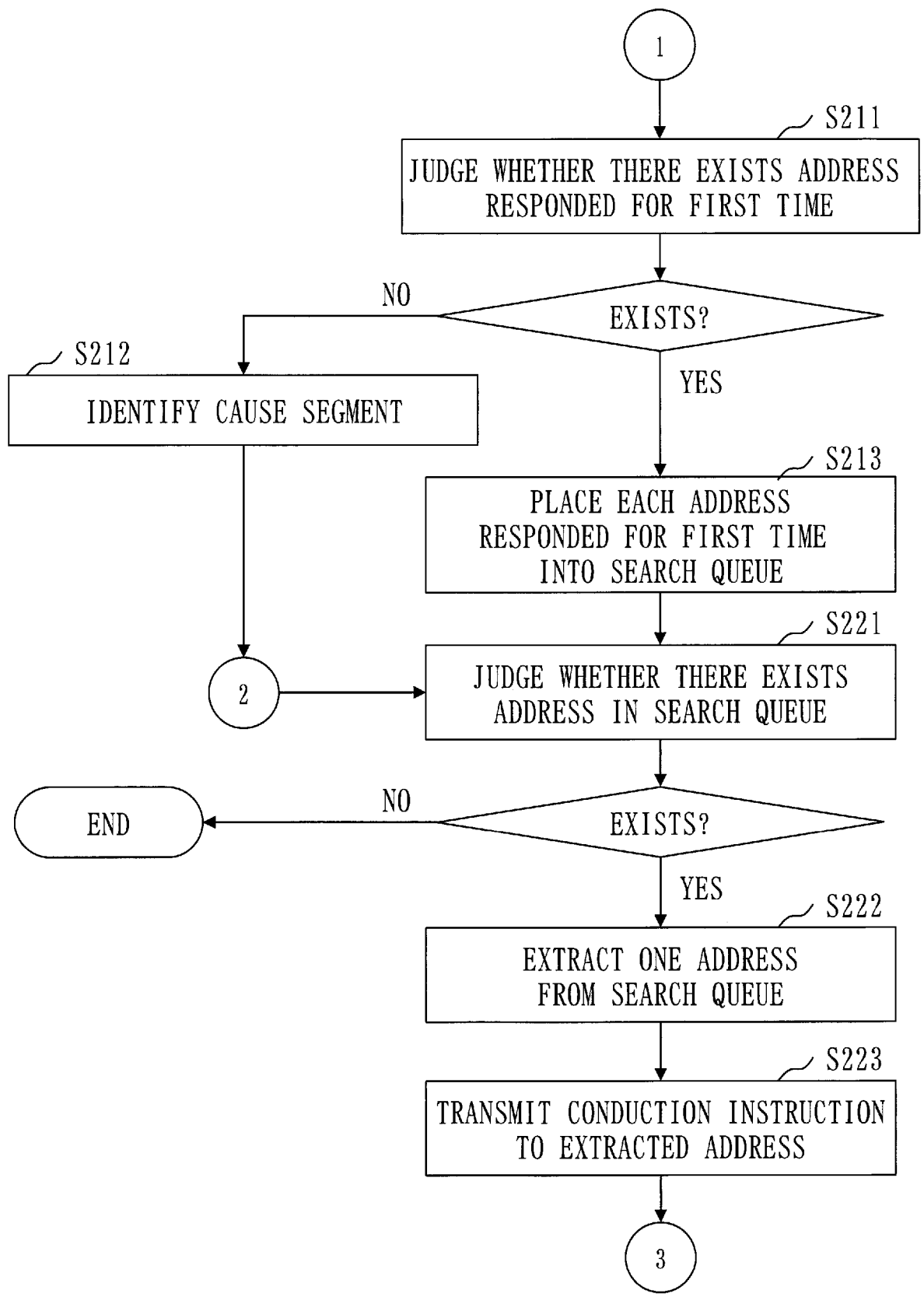
FIG. 11 is a flowchart of the operation confirmation method in Embodiment 1.

Step S202 to step S223 are the same as those described in Embodiment 1 (see FIGS. 10 and 11).

Effect of Embodiment 2

According to Embodiment 2, it is possible to obtain a layout of the construction assisting tools 140 that optimizes a balance of the operation confirmation cost concerning a time required for operation confirmation employing the construction assisting tools 140 and a risk of construction mistake that can occur in construction of the apparatus network system 110.

According to Embodiment 2, it is possible to activate only the to-be-used construction assisting tools 140 designated by the layout data, and to use only the construction assisting tool 140 that are activated in operation confirmation at the time of setting up the apparatus network system 110. Note that inactivated construction assisting tools 140 are put into a conductive state. A location where the inactivated construction assisting tools 140 are installed is always in electrically the same state as a location where the construction assisting tools 140 are not installed.

Supplemental to Embodiments

Figure 14:
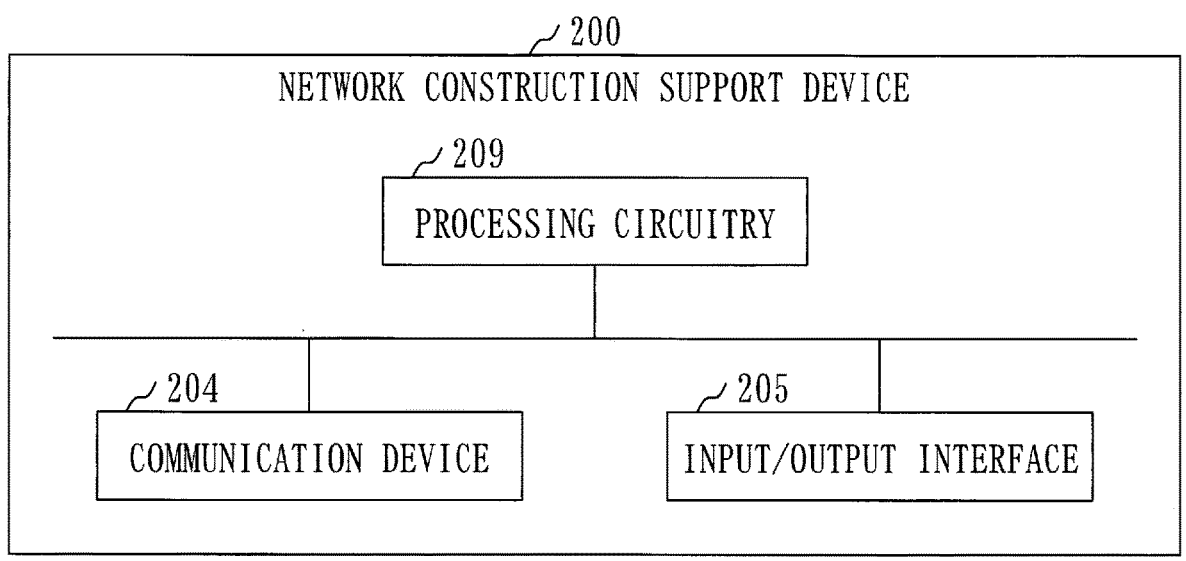
FIG. 14 is a hardware configuration diagram of the network construction support device 200 in embodiments.

A hardware configuration of the network construction support device 200 will be described with referring to FIG. 14.

The network construction support device 200 is provided with processing circuitry 209.

The processing circuitry 209 is hardware that implements the information accepting unit 210, the layout data generation unit 220, the index value calculation unit 230, the layout data judging unit 240, and the result output unit 250.

The processing circuitry 209 may be dedicated hardware, or may be a processor 201 that runs the program stored in the memory 202.

In a case where the processing circuitry 209 is dedicated hardware, the processing circuitry 209 is, for example, a single circuit, a composite circuit, a programmed processor, a parallel-programmed processor, an ASIC, or an FPGA; or a combination of a single circuit, a composite circuit, a programmed processor, a parallel-programmed processor, an ASIC, and an FPGA.

ASIC stands for Application Specific Integrated Circuit.
FPGA stands for Field Programmable Gate Array.

The network construction support device 200 may be provided with a plurality of processing circuitries that substitute for the processing circuitry 209. The plurality of processing circuitries share a function of the processing circuitry 209.

In the network construction support device 200, some functions may be implemented by dedicated hardware, and the remaining functions may be implemented by software or hardware.

In this manner, the functions of the network construction support device 200 can be implemented by hardware, software, or firmware; or by a combination of hardware, software, and firmware.

Each embodiment is an exemplification of a preferable mode and is not intended to limit the technical scope of the present invention. Each embodiment may be practiced partly, or may be practiced in combination with another embodiment. The procedures described with using the flowcharts and the like may be modified as necessary.

REFERENCE SIGNS LIST

100: network construction support system; 101: layout data; 110: apparatus network system; 120: controller; 121A: processor; 121B: memory; 121C: auxiliary storage device; 121D: communication device; 121E: input/output interface; 122: operation confirmation unit; 129: storage unit; 130: communication apparatus; 131A: processor; 131B: memory; 131C: auxiliary storage device; 131D: communication device; 131E: input/output interface; 131F: terminal box; 132: assisting tool control unit; 139: storage unit; 140: construction assisting tool; 141: apparatus connection terminal; 142: upward wiring terminal; 143: downward wiring terminal; 144: switch circuit; 145: switch control circuit; 150: tree structure graph; 200: network construction support device; 201: processor; 202: memory; 203: auxiliary storage device; 204: communication device; 205: input/output interface; 209: processing circuitry; 210: information accepting unit; 220: layout data generation unit; 230: index value calculation unit; 240: layout data judging unit; 250: result output unit; 290: storage unit.

The invention claimed is:

1. A network construction support system which proposes a layout of one or more units of construction assisting tools for a sake of an apparatus network system having a plurality of communication apparatuses connected by multi-drop,
   each of the construction assisting tools being an apparatus used for narrowing down a range that involves a cause location of a fault when the fault occurs in the apparatus network system,
   the network construction support system comprising:
   processing circuitry
   to generate one or more pieces of layout data indicating a layout of the construction assisting tools;
   to calculate a countermeasure cost and an estimated risk amount, for each layout data, the countermeasure cost increasing as a number of units of construction assisting tools increases, the estimated risk amount decreasing as the number of units of construction assisting tools increases and as a narrowed range by each construction assisting tool narrows;
   to judge an appropriateness of the layout data for the apparatus network system, for each layout data, on a basis of the countermeasure cost, the estimated risk amount, and an allowable risk amount which is allowed for the apparatus network system; and
   to output layout data judged to be appropriate for the apparatus network system.

2. The network construction support system according to claim 1,
   wherein if it is judged that the generated layout data is not appropriate for the apparatus network system, the processing circuitry generates layout data indicating a number of units of construction assisting tools different from the number of units of construction assisting tools indicated in the generated layout data.

3. The network construction support system according to claim 1,
   wherein the processing circuitry decides a dividing number on the basis of the number of units of construction assisting tools, calculates a number of units of communication apparatuses of each divisional region of the apparatus network system on the basis of the decided dividing number and a number of units of communication apparatuses of the apparatus network system, decides each divisional region such that the divisional region involves the calculated number of units of communication apparatuses, and generates layout data that indicates a layout of construction assisting tools in which the apparatus network system is divided among the decided divisional regions.

4. The network construction support system according claim 1,
   wherein the layout data indicates a layout of construction assisting tools installed in the apparatus network system, and
   wherein the processing circuitry calculates a cost required for installing the construction assisting tools as the countermeasure cost.

5. The network construction support system according to claim 1,
wherein the layout data indicates a layout of construction assisting tools to be used for operation confirmation of the apparatus network system, and
wherein the processing circuitry calculates a cost required for confirming, with using the construction assisting tools, operations of the apparatus network system as the countermeasure cost.

6. The network construction support system according to claim 2,
wherein the layout data indicates a layout of construction assisting tools installed in the apparatus network system, and
wherein the processing circuitry calculates a cost required for installing the construction assisting tools as the countermeasure cost.

7. The network construction support system according to claim 2,
wherein the layout data indicates a layout of construction assisting tools to be used for operation confirmation of the apparatus network system, and
wherein the processing circuitry calculates a cost required for confirming, with using the construction assisting tools, operations of the apparatus network system as the countermeasure cost.

8. The network construction support system according to claim 3,
wherein the layout data indicates a layout of construction assisting tools installed in the apparatus network system, and
wherein the processing circuitry calculates a cost required for installing the construction assisting tools as the countermeasure cost.

9. The network construction support system according to claim 3,
wherein the layout data indicates a layout of construction assisting tools to be used for operation confirmation of the apparatus network system, and
wherein the processing circuitry calculates a cost required for confirming, with using the construction assisting tools, operations of the apparatus network system as the countermeasure cost.

10. The network construction support system according to claim 2,
wherein the processing circuitry decides a dividing number on the basis of the number of units of construction assisting tools, calculates a number of units of communication apparatuses of each divisional region of the apparatus network system on the basis of the decided dividing number and a number of units of communication apparatuses of the apparatus network system, decides each divisional region such that the divisional region involves the calculated number of units of communication apparatuses, and generates layout data that indicates a layout of construction assisting tools in which the apparatus network system is divided among the decided divisional regions.

11. The network construction support system according to claim 10,
wherein the layout data indicates a layout of construction assisting tools installed in the apparatus network system, and
wherein the processing circuitry calculates a cost required for installing the construction assisting tools as the countermeasure cost.

12. The network construction support system according to claim 10,
wherein the layout data indicates a layout of construction assisting tools to be used for operation confirmation of the apparatus network system, and
wherein the processing circuitry calculates a cost required for confirming, with using the construction assisting tools, operations of the apparatus network system as the countermeasure cost.

* * * * *